United States Patent [19]

Bruninga et al.

[11] Patent Number: 4,592,505
[45] Date of Patent: Jun. 3, 1986

[54] QUICK DISCONNECT MOUNTED PROGRAMMING MEANS FOR SPRINKLER

[75] Inventors: Kenneth J. Bruninga, Mapleton; Douglas C. Fletcher, Peoria, both of Ill.

[73] Assignee: L. R. Nelson Corporation, Peoria, Ill.

[21] Appl. No.: 575,012

[22] Filed: Jan. 30, 1984

[51] Int. Cl.$^4$ ............................................. A01G 27/00
[52] U.S. Cl. .................................. 239/69; 137/624.18
[58] Field of Search .......................... 239/572, 69, 70; 137/624.2, 624.18, 119; 251/131

[56] References Cited

U.S. PATENT DOCUMENTS

| | | | |
|---|---|---|---|
| 3,172,604 | 3/1965 | Brock | 239/70 |
| 3,386,620 | 10/1966 | Smith | 251/131 X |
| 3,679,134 | 7/1972 | Nixon | 239/70 |
| 3,865,138 | 2/1975 | Jones | 239/70 X |
| 3,921,667 | 11/1975 | Corliss et al. | 239/70 X |
| 3,921,904 | 11/1975 | Roveda | 239/70 |
| 4,023,585 | 5/1977 | VandenBurg | 239/70 X |
| 4,156,437 | 5/1979 | Chivens et al. | 137/624.18 X |
| 4,165,532 | 8/1979 | Kendall | 239/70 X |
| 4,168,419 | 8/1979 | Sturman et al. | 239/70 X |
| 4,189,776 | 2/1979 | Kendall | 239/70 |
| 4,282,899 | 8/1981 | Dunckhorst | 239/70 X |
| 4,316,480 | 2/1982 | Kah | 137/119 |

FOREIGN PATENT DOCUMENTS 906454  2/1982  U.S.S.R. ................... 239/69

*Primary Examiner*—Joseph F. Peters, Jr.
*Assistant Examiner*—Kevin Patrick Weldon
*Attorney, Agent, or Firm*—Cushman, Darby & Cushman

[57] ABSTRACT

Apparatus for connection with a sill cock for communicating water under pressure from the sill cock with a hose having a lawn sprinkler communicating therewith comprising a water control unit having a female coupler for connection with the sill cock, a male coupler for connection with the hose, a valve between the couplers and a battery operated valve mechanism operable in response to the connection of the electric current thereto for effecting movement of the valve from a closed position into an opened position, and a manually portable programming unit containing a battery operated programming keyboard, a battery operated display, and batteries operatively connected therewith. Plug and socket assemblies serve to mount the portable unit in supported relation on the first unit in an operative position and for disengagement to enable the portable unit to be disposed in a remote position with respect to the fixed first unit such that a user can operate the programming keyboard remote from the first unit allowing for observation of the display at close eye-level proximity. An extension cord accessory is provided which renders the portable unit operable to operate the first unit either in its operative position or when the portable unit is disposed in a remote position. When the portable unit is provided with a modified keyboard permitting programming of three separate water cycles, the apparatus forms part of a whole lawn watering system which includes a steeping valve unit operable as each watering cycle occurs to connect the outlet of the water control unit to a different sprinkler.

17 Claims, 17 Drawing Figures

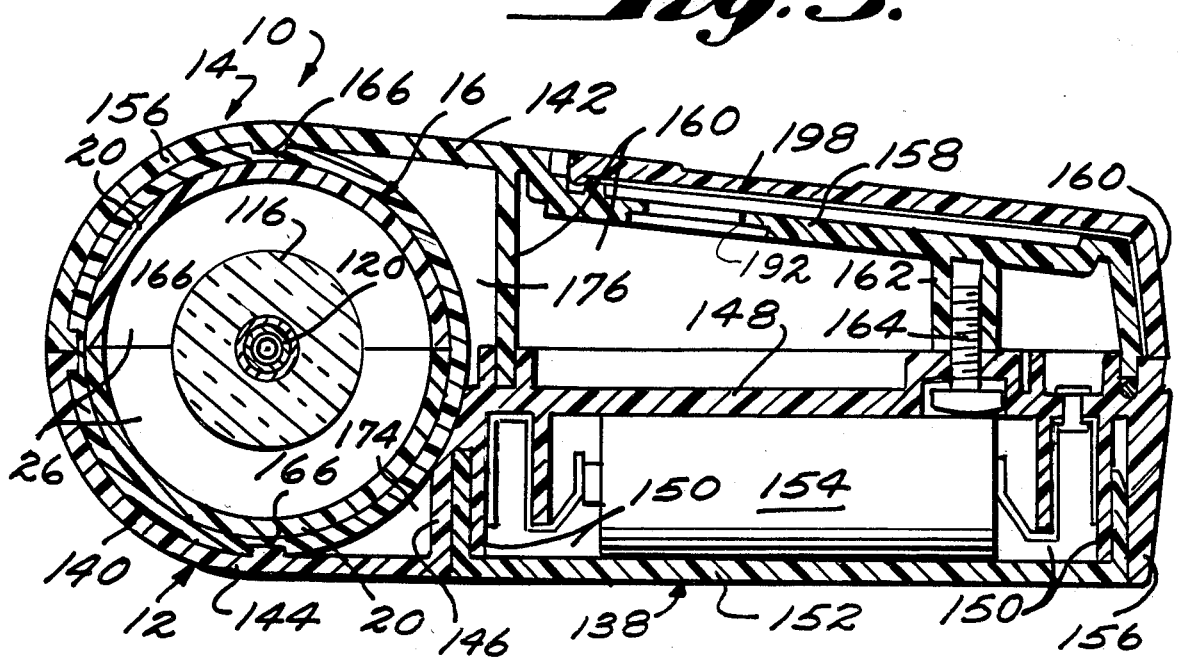
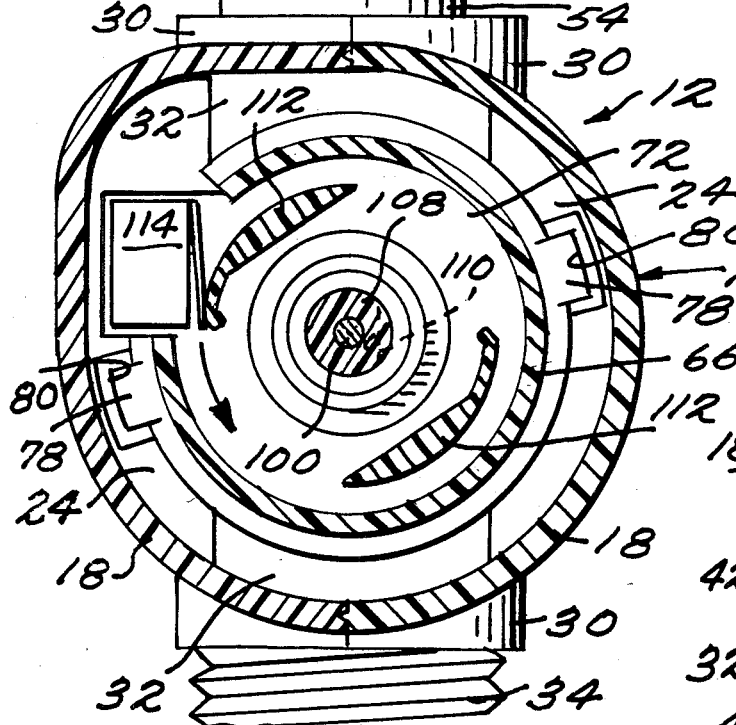
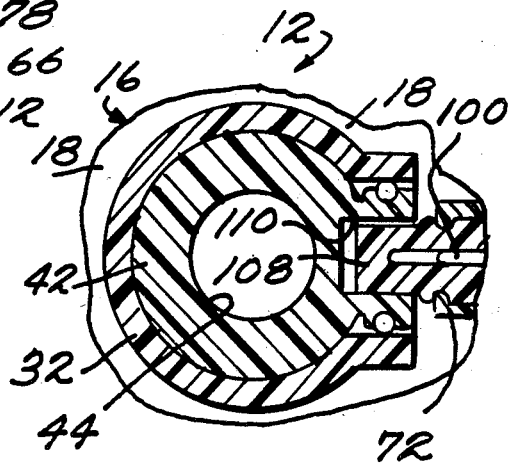

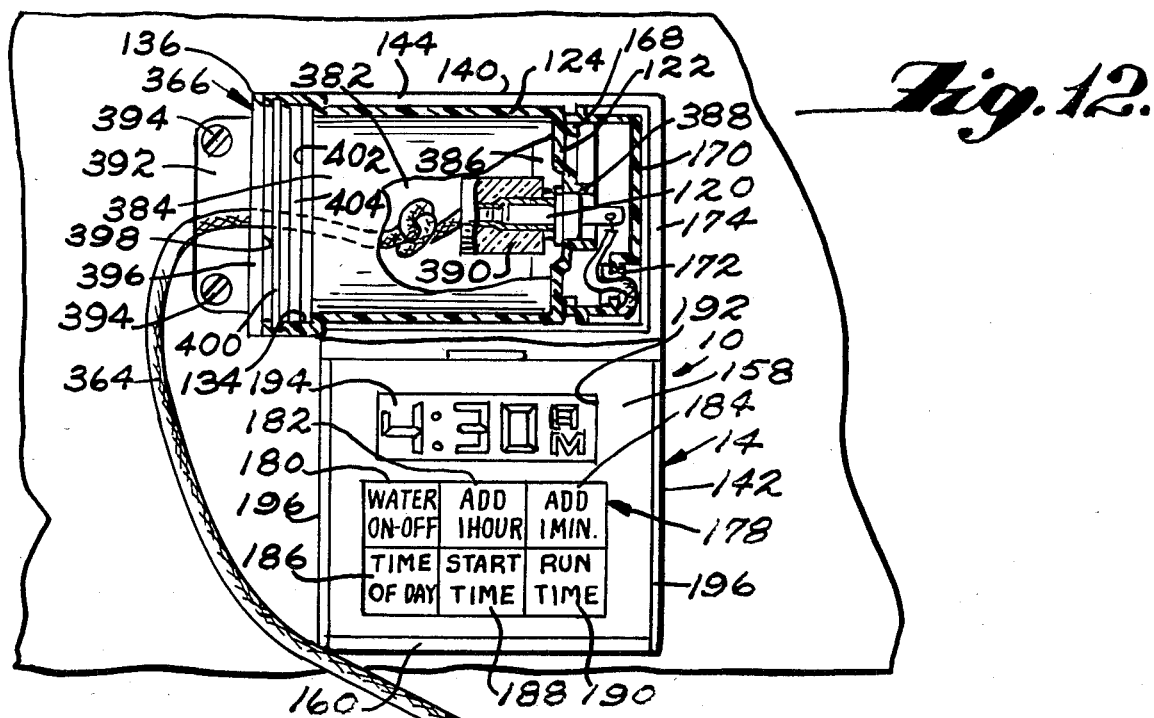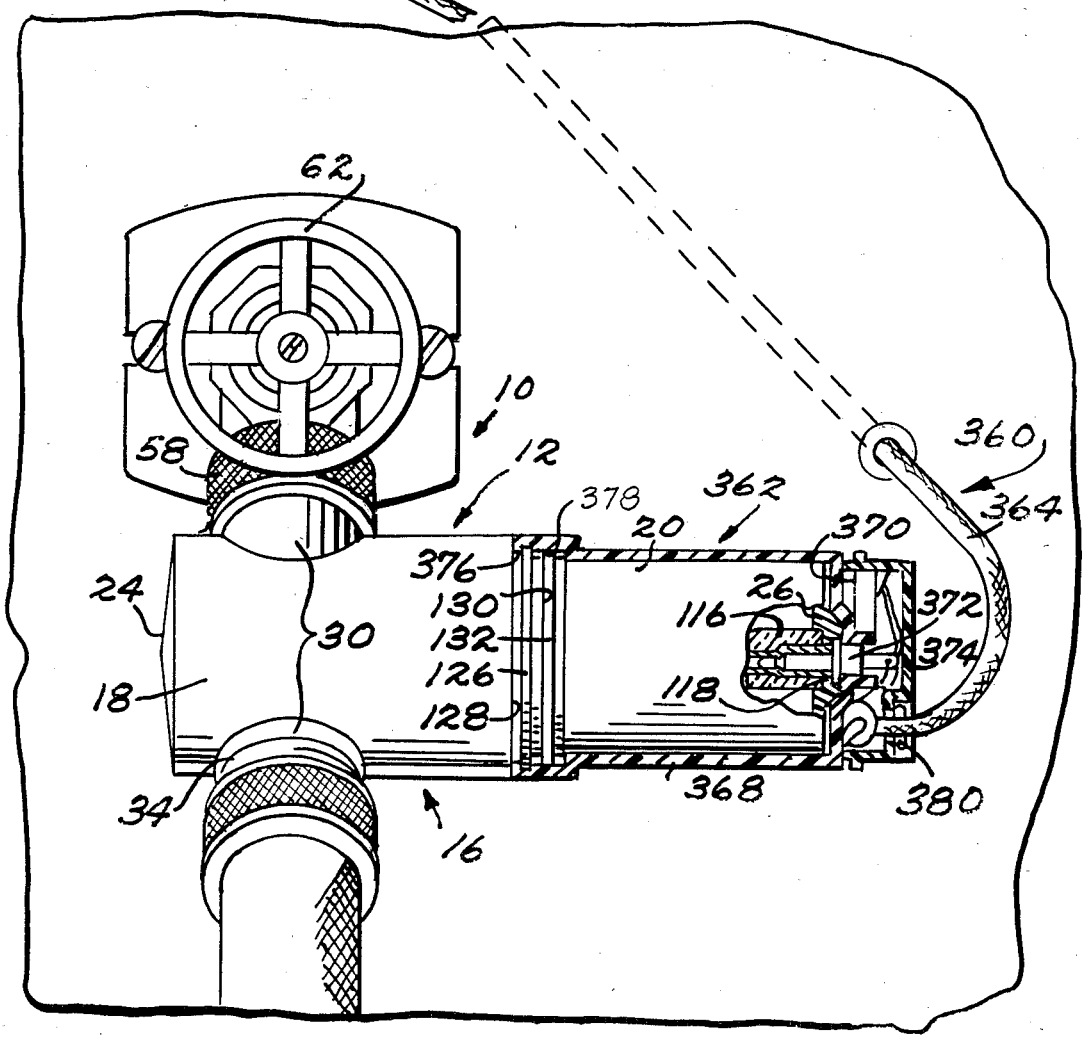
Fig. 12.

QUICK DISCONNECT MOUNTED PROGRAMMING MEANS FOR SPRINKLER

This invention relates to sprinkling and more particularly to improvements enabling above-ground sprinklers to water automatically.

Automatic lawn watering systems have been known for many years. A typical system consists of a series of pop-up sprinkler heads which are embedded in the ground at appropriate positions throughout the lawn area to be sprinkled. Usually the heads are divided into several watering zones embodying one or more than one sprinkler head, depending upon their capacity and the capacity of the water source available. The sprinkler heads are connected in zones by an underground embedded conduit, usually plastic pipe, and a solenoid operated valve is provided for controlling the communication of water to each zone. A fixed controller operating usually from normal A-C. house current is provided for turning off and turning on the various valves in accordance with a selected program. These underground installed systems are effective. However, the high cost of installation severely restricts their utilization. Especially in areas where the yearly rainfall is usually sufficient to maintain lawn growth, it is hard to justify the large cost involved in the underground system components and the installation labor.

The usual alternative to an expensive underground system is to forget about sprinkling until the lawn is in danger of dying due to lack of water and then to simply connect a lawn sprinkler to one end of a hose, set it on the lawn in a position to get maximum coverage, connect the other end of the hose to the sill cock and turn on the water. All too often such sprinkling is ineffective or too late. Thus, the practical situation presented is either one of extreme automation and cost or little cost and total manual operation.

There have been various attempts to provide inexpensive sprinkling aids for use with above ground sprinklers, such as timers. The usual inexpensive timer includes a dial which is turned when the water is turned on. The dial is turned to a particular setting within a given time range and at the end of the time set a valve in the timer shuts off the water to the sprinkler. Thus, at best, these inexpensive timers do nothing more than save the homeowner the trouble of turning off the water after a satisfactory watering period has expired.

One of the greatest advantages of the expensive automatic underground systems is that the most desirable sprinkling time can be chosen to accomplish the actual watering which is in the pre-dawn early morning period or slightly thereafter, a time when most home owners are asleep. Inexpensive timers which merely shut off the water once it is manually turned on are no real help at all in enabling a simple hose mounted sprinkler to be turned on at a time when the home owner wants to sleep.

Expensive automatically controlled valves for turning on and turning off the flow of liquids in chemical processes and other industrial applications are known. At least one similar unit has been offered for sale for controlling a water sprinkler. This known unit is sold under the trade name "RainMatic". The RainMatic unit has a relatively large unitized housing providing a programming face or keyboard presenting sixteen keys or designated key positions. The unit is programmed by pushing the keys provided a multiplicity of times in accordance with a sequence given in a program booklet. An audible signal is sounded to indicate that an intended push has been effectively entered. There is no way of checking what program has been entered once it is entered. Finally, the unit is much more expensive than typical inexpensive commercially available timers. There still exists a need for a simpler, substantially less expensive device which will not only turn off the water after a predetermined watering time has been completed, like the known inexpensive timers, but will turn it on, as well, at any desired preset time, such as in the early morning hours, like the more expensive and complex known unit discussed above.

It is an object of the present invention to fulfill the need discussed above. In accordance with the principles of the present invention this objective is obtained by providing an apparatus for connection with a sill cock for communicating water under pressure from the sill cock with a hose having a lawn sprinkler communicating therewith which comprises a female coupler for connection with the sill cock, a male coupler for connection with the hose and a valve between the couplers movable into opened and closed positions with respect thereto so as to permit and prevent respectively communication of the water under pressure from the sill cock when the female coupler is connected therewith with the hose when the male coupler is connected therewith. The apparatus further includes one or more batteries for providing a source of electrical current, a valve moving mechanism operable in response to the connection of the electric current from the battery therewith for effecting movement of the valve from its closed position into its opened position, a battery operated programming keyboard for selecting a sprinkling time in the future when it is desired to water with the sprinkler, a battery operated display for displaying the sprinkling time selected by the programming keyboard and an electrical connection operable when the sprinkling time selected arrives for connecting an electrical current from the battery with the valve moving mechanism. An important aspect of the present invention is that the components mentioned above are mounted in a plurality of separate housing units including a first housing unit containing the male coupler, the valve and the female coupler so as to render the first housing unit operable to be fixed to the sill cock in supported relation thereby when the female coupler is connected therewith. The plurality of housing units also include a manually portable housing unit containing the battery operated programming keyboard, the battery operated display and the battery operatively connected therewith such that a user can operate said programming means remote from said first housing unit allowing for observation of the display at close eye level proximity.

In this way, the programming keyboard can be made quite simple. As few as six keys provide the ability in conjunction with the display to program a single watering cycle at any time of the day. The six keys are (1) water-on-off, (2) time of day, (3) start time, (4) run time, (5) hour advance and (6) minute advance. The simple procedure involved is to push the time of day key—then set the hours and minutes on the display which correspond to the actual time. Next, the start time key is pushed and the hours and minutes are set on the display to correspond to the time when the watering should begin. Finally, the run time key is pushed and the hours and minutes of the desired run are set on the display. The ability to accomplish the programming, while a small portable housing separate from the valve unit fixed to the sill cock is held at an eye level suitable to view the display, provides a significant simplicity and convenience without adding cost. Indeed, the valve housing unit fixed to the sill cock can likewise be optimized functionally in the sense of placing the outlet of the unit as close as possible to the outlet of the sill cock to which it is attached so as to minimize the lever arm through which forces applied through the hose act.

Preferably, the valve is a ball valve and the valve moving mechanism is a d-c motor driving a planetary gear reduction unit connected to turn the ball valve in one direction until stopped after each quarter revolution by a cam actuated switch all of which form a part of the fixed housing unit. Electrical socket and plug assemblies serve to electrically connect the output signal of the portable programming unit with the d-c motor and switch circuit of the fixed unit when the two units are interconnected. A further advantage of providing separate units of this type is that by providing an extension cord accessory with compatible plug and socket assemblies the programming unit can be supported at a remote location, as, for example, on an inside garage or kitchen wall or the like, for both inside programming and operation of the remote outside fixed unit. On an inside wall the display of the programming unit serves as a clock.

A still further advantage of providing separate units is that it becomes possible to offer not only a simple inexpensive one shot programming unit, but an alternative more elaborate programming unit, as, for example, an 12 key unit having the capability of programming a plurality of separate watering times (e.g. three) in any one day and of programming their day-to-day frequency.

In accordance with the principles of the present invention a programming unit of the more elaborate type has the greater advantage of forming a component of an above-ground watering system for the entire lawn rather than just the area covered by a single sprinkler. In accordance with the principles of the present invention, the system requires merely the utilization of plural sprinklers and hose sufficient to connect the sprinklers to the plural outlets of a portable stepping valve unit providing a support enabling it to be displayed on the lawn in a position such that its single inlet can be connected by a hose to the outlet of the valve unit fixed on the sill cock. The portable stepping valve unit of the system operates in response to each water turn on-water turn off cycle to communicate the water turned on progressively to each of the plural outlets provided. In this way, each separate watering period programmed will be applied to a separate sprinkler supported on a separate area of the lawn, thus enabling the entire lawn to be watered automatically at the most desirable time while the home owner is fast asleep.

Accordingly, it is a further object of the present invention to provide a system of the type described embodying a plural watering period programming unit, a cooperable sill cock mounted fixed unit, a stepping valve unit, a plurality of sprinklers all of which are appropriately hose-connected, which system is effective in operation and economical to manufacture.

These and other objects of the present invention will become more apparent during the course of the following detailed description and appended claims.

The invention may best be understood with reference to the accompanying drawings, wherein an illustrative embodiment is shown.

IN THE DRAWINGS

FIG. 3, is a fragmentary cross-sectional view taken along the line 3—3 of FIG. 2;

FIG. 4 is a cross-sectional view taken along the line 4—4 of FIG. 2;

FIG. 5 is a cross-sectional view taken along the line 5—5 of FIG. 1;

FIG. 6 is a block diagram of the control electronics;

FIG. 12 is a view similar to FIG. 1 showing an extension cord accessory connected between the sill cock mounted water control unit and the programming unit;

FIG. 14 shows an addition to convert the main program illustrated in FIGS. 7 and 8 for the more elaborate programming unit embodiment;

Figure 9:
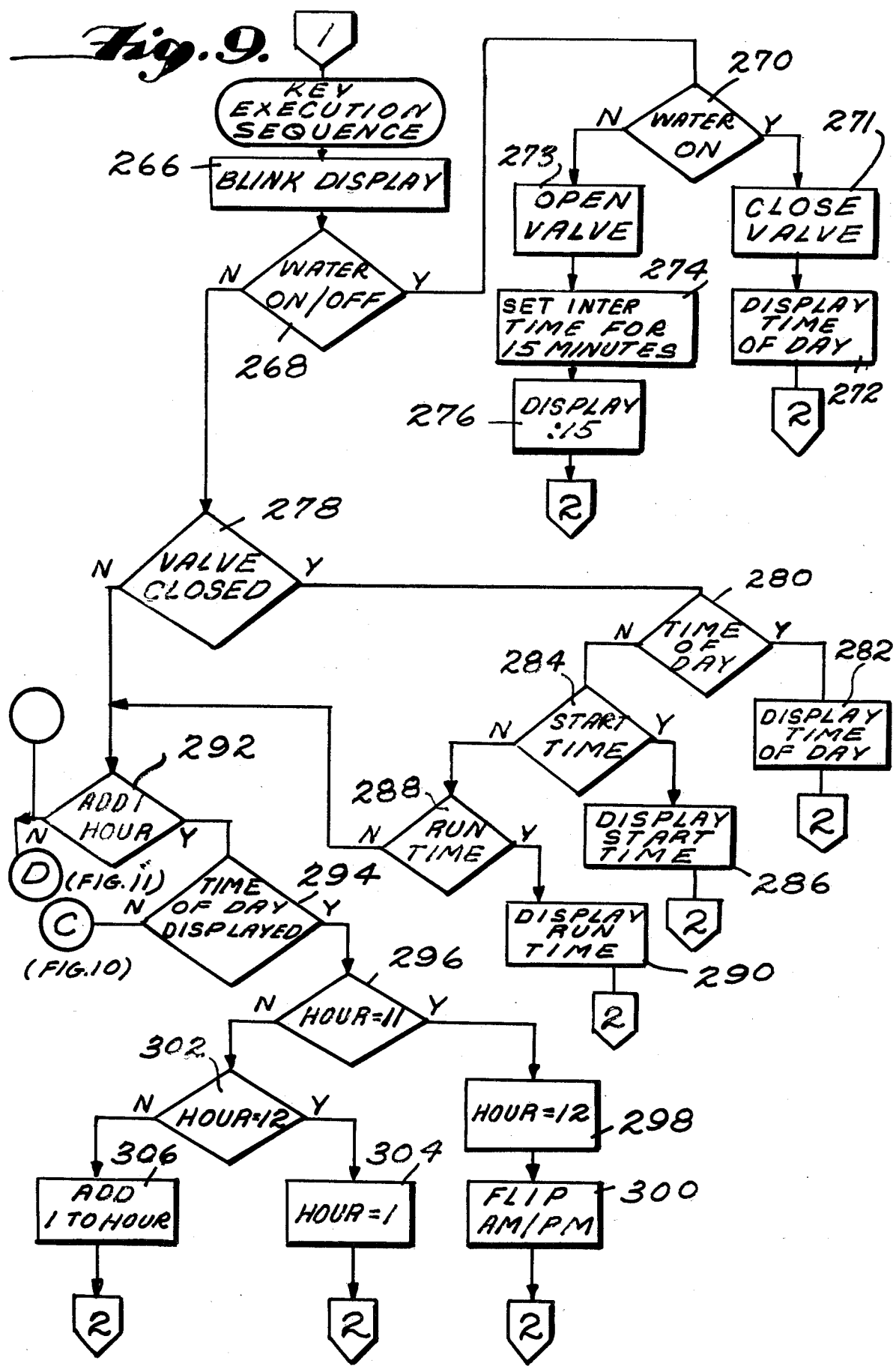
FIGS. 9 through 11 represent a flow diagram of the key execution sub-routine for the program of FIGS. 7 and 8.
Figure 10:
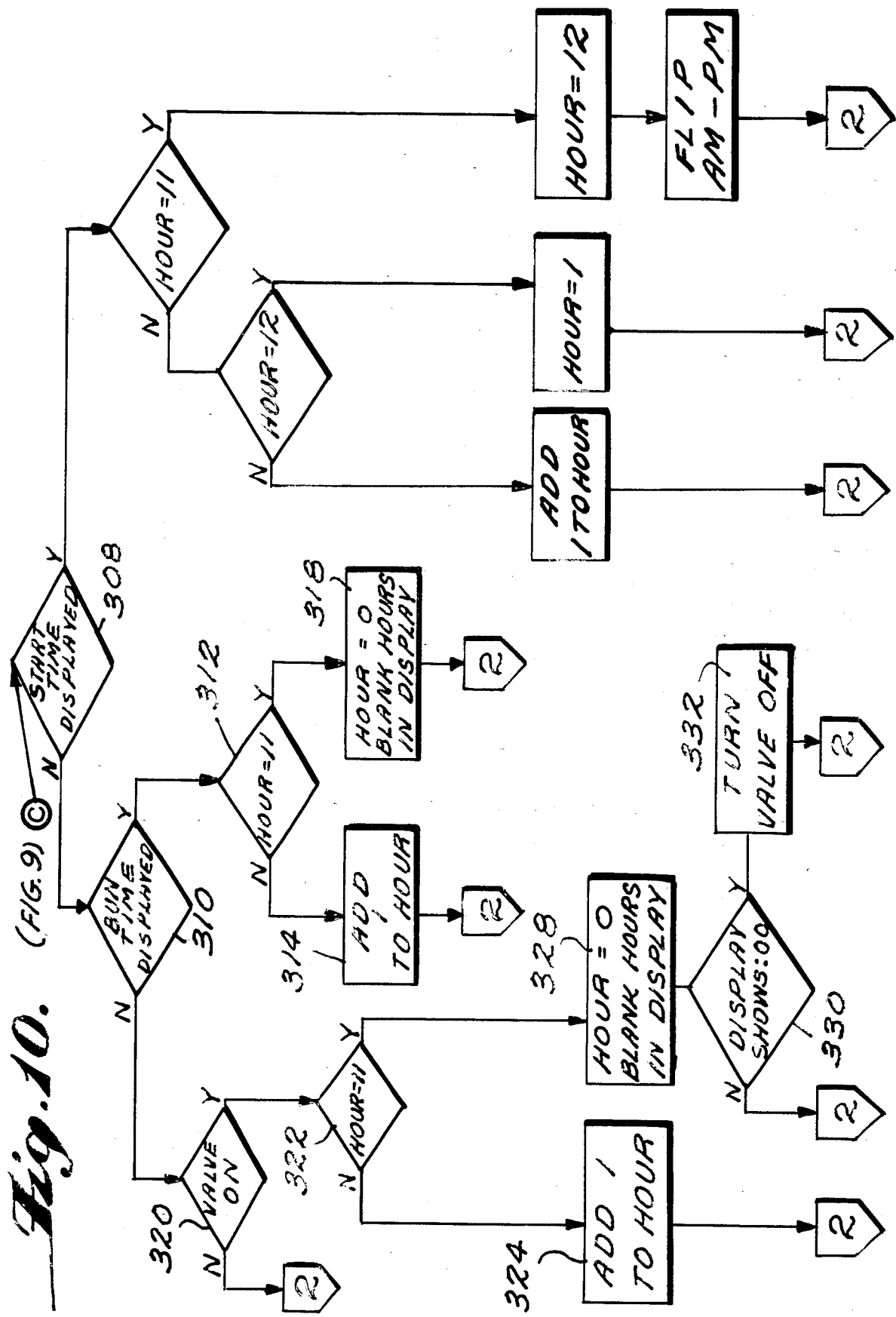
Figure 11:
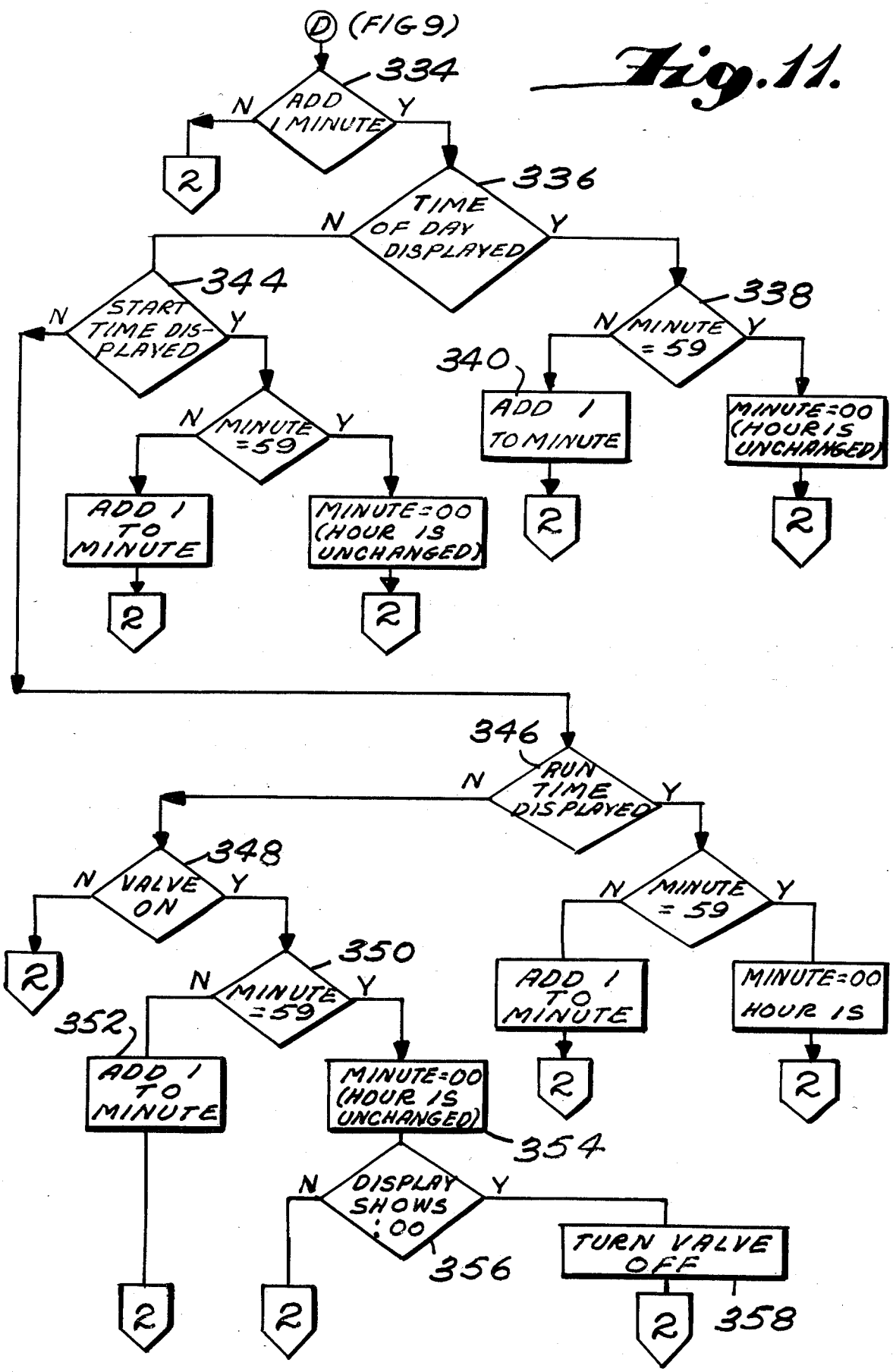
Figure 13:
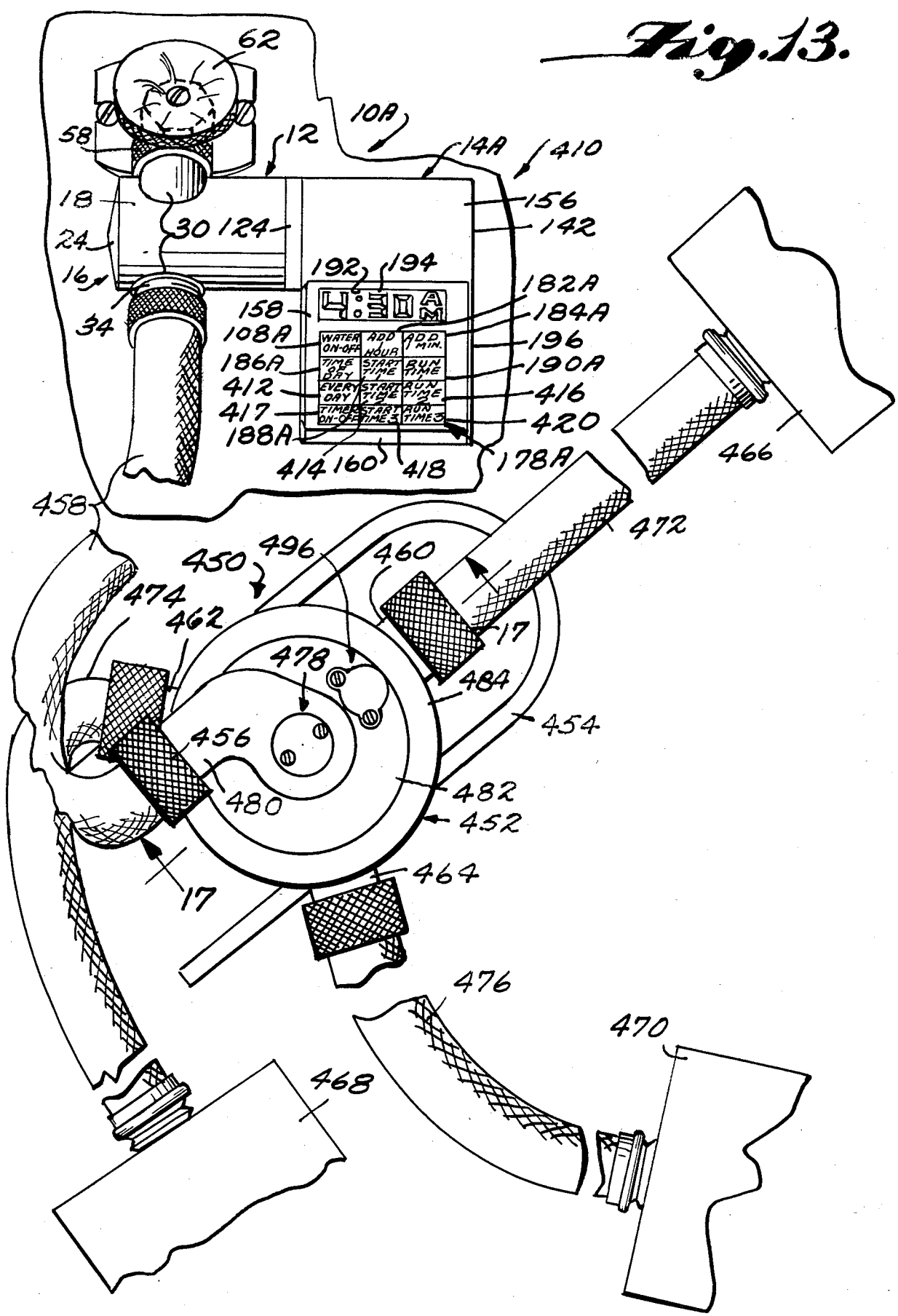
FIG. 13 is a diagramatic top plan view of a complete above-ground lawn watering system embodying the principles of the present invention including a programming unit of a more elaborate capability.
Figures 14, 15, 16:
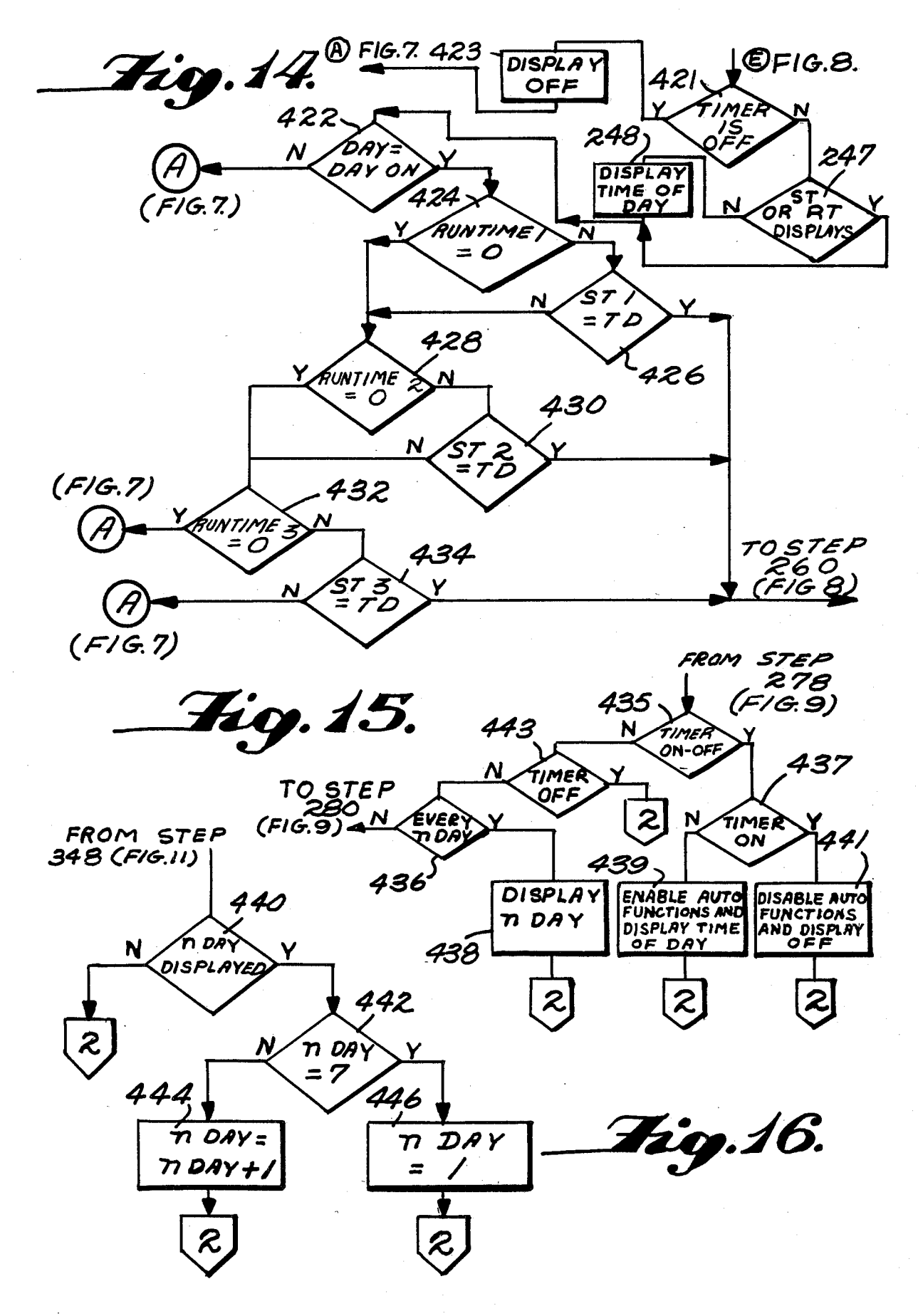
Figure 17:
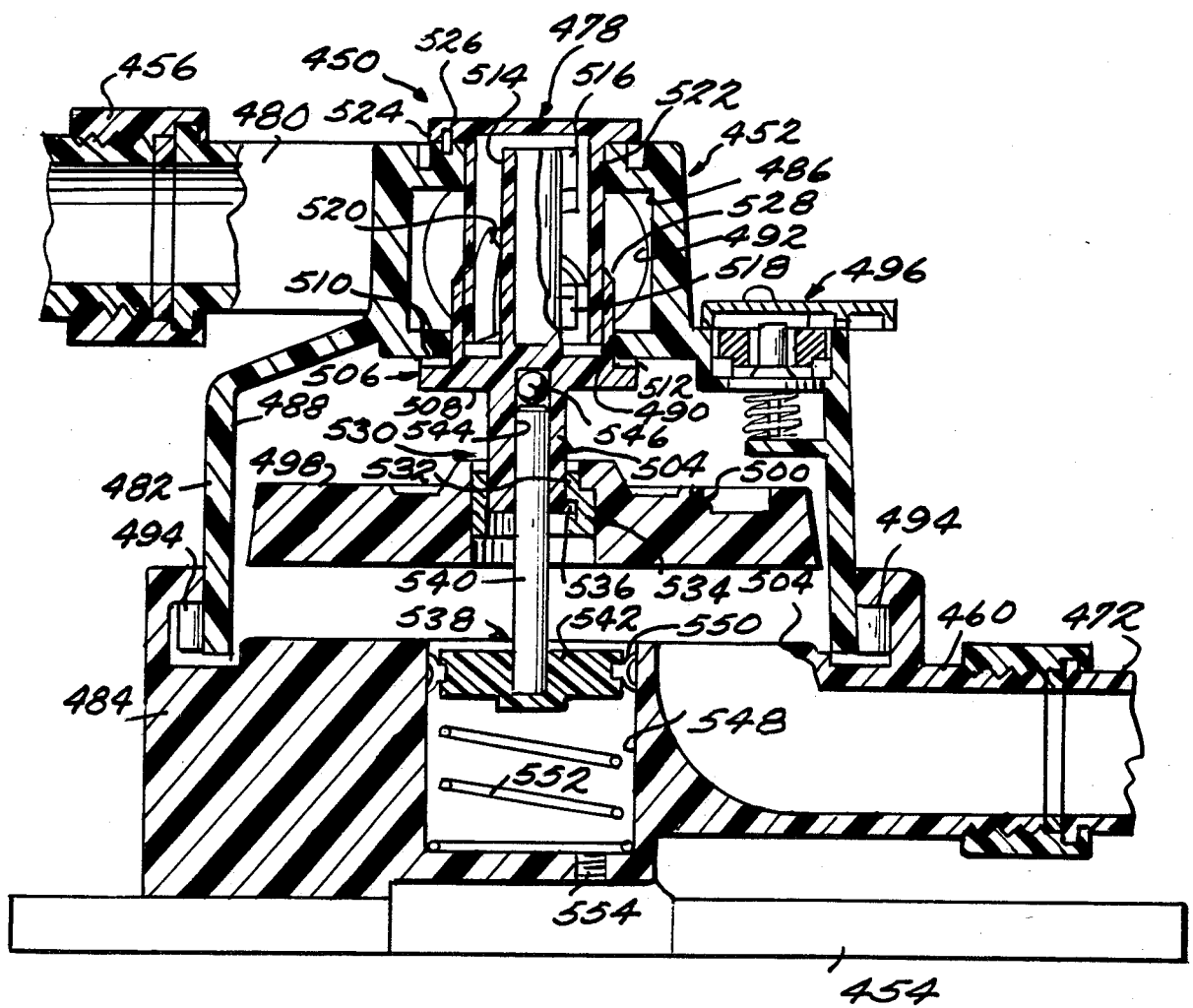

FIGS. 15 and 16 show additions to convert the key execution sub-routine of FIGS. 9 through 11 for the program additions of FIG. 14; and FIG. 17 is an enlarged cross-sectional view 30 taken along the line 17—17 of FIG. 13 showing the stepping value unit of the system.

Figure 1:
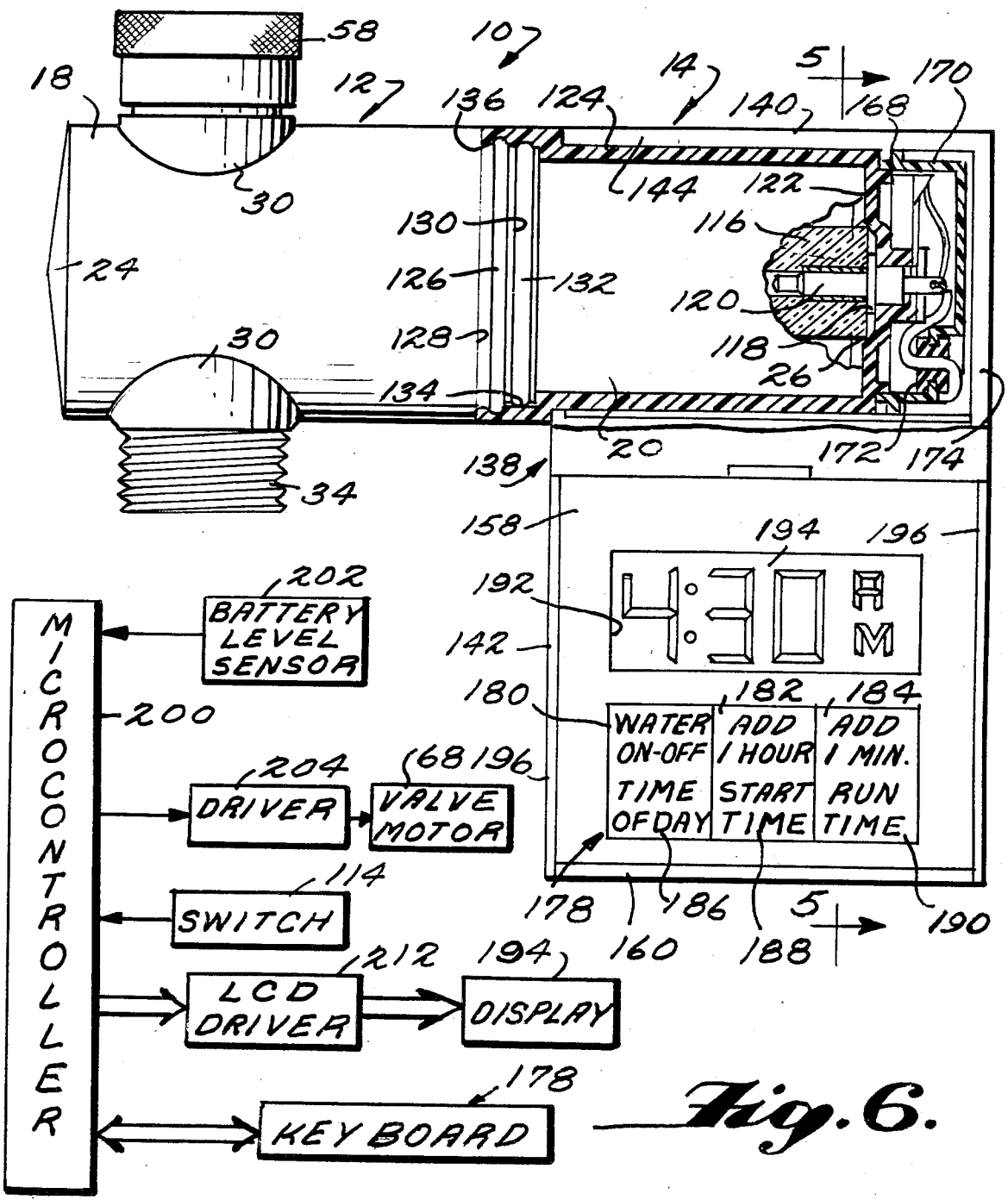
FIG. 1 is a front elevational view of one form of apparatus embodying the principles of the present invention showing the programming unit partly in section and with the cover removed.

Referring now more particularly to FIG. 1 of the drawings, there is shown therein an apparatus, generally indicated at 10, for connection with a sill cock for communicating water under pressure from the sill cock with a hose having a lawn sprinkler communicating therewith. The apparatus 10, as shown, includes a sill cock mounted water control unit, generally indicated at 12, adapted to be fixed in supported relation with a conventional sill cock commonly found in dwellings and in other buildings as well. Detachably connected in supported relation with the water control unit 12 is a portable programming unit, generally indicated at 14.

Figure 2:
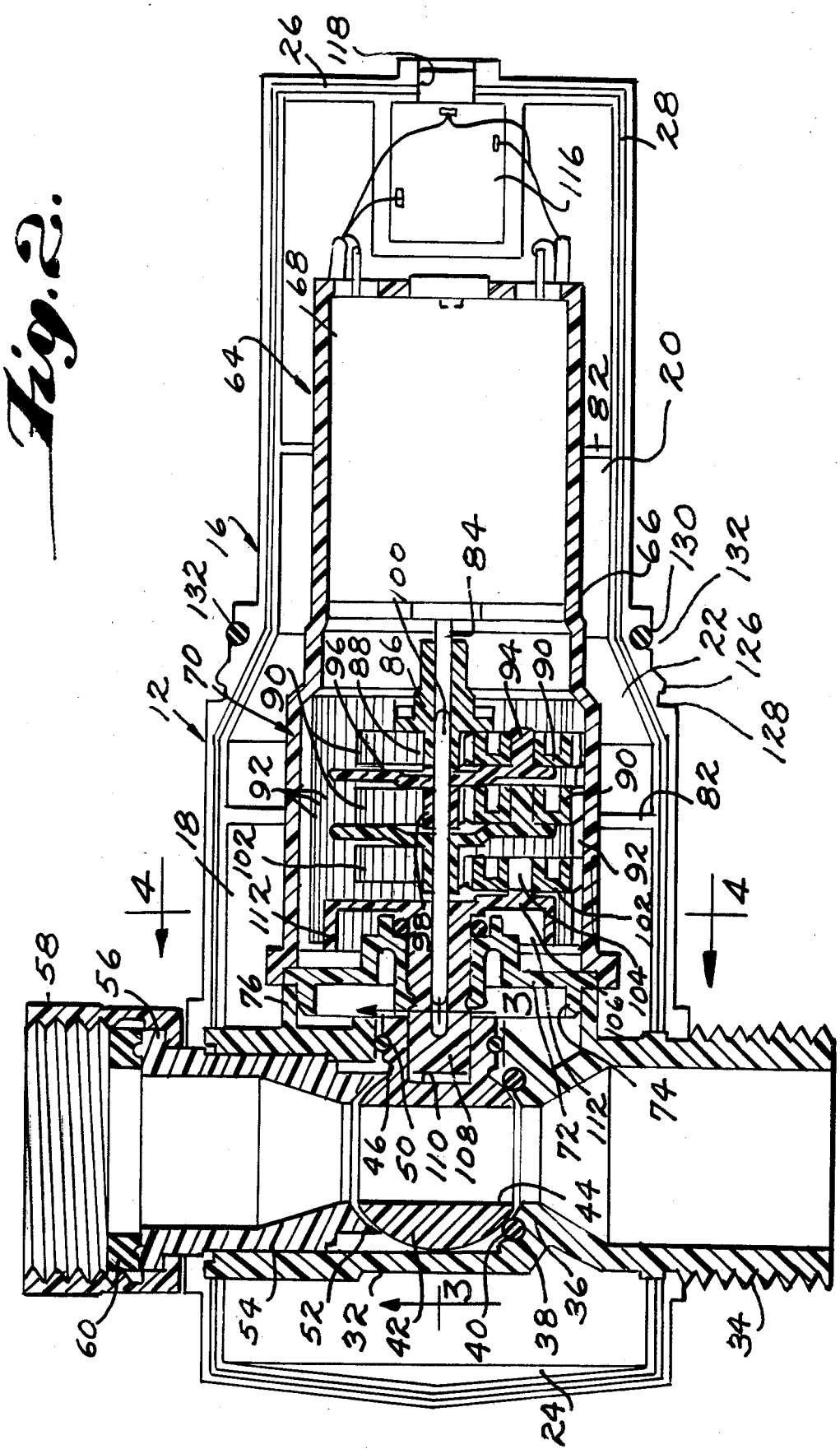
FIG. 2 is an enlarged vertical sectional view of the sill cock mounted water control unit.

As best shown in FIG. 2, the water control unit 12 includes an exterior housing assembly, generally indicated at 12, which is formed essentially of two complementary hollow half sections each including a large diameter generally semi-cylindrical peripheral wall portion 18, a small diameter semi-cylindrical peripheral wall portion 20 and a semi-frustoconical transition wall portion 22 between the wall portions 18 and 20. A semi-circular end wall 24 is formed on the open end of each large semi-cylindrical wall portion 18. Similarly, the free end of each small diameter wall portion 20 is closed by a semi-circular end wall 26. As shown, the peripheral wall portions and end walls of each section are formed with free edges disposed in a common plane so as to be capable of being moved into abutting relation to one another. As shown in FIG. 2, the edge of one of the housing sections is formed with a bead 28 which materially aids in fixedly assembling the two half sections together, as by heat welding, such as sonic welding or the like.

Formed in the large peripheral wall portion 18 of each half section is a pair of oppositely extending semi-cylindrical boss portions 30 each of which defines a semi-cylindrical opening which is formed in and interrupts the adjacent edge configuration. Mounted within the interior of the bosses 30 in fixed relation is a tubular valve housing member or casing 32. One end of the valve casing 32 extends outwardly through one pair of associated boss portions 30 and is formed into a conventional male hose coupler 34. The central interior of the valve casing 32 has an interior annular flange formed therein providing an annular groove 38 within which is seated an O-ring seal 40 adapted to engage one exterior end portion of a ball valve 42 mounted within the central portion of the casing 32 for rotational movement about an axis intersecting the axis of the tubular casing 32 at right angles thereto. The ball valve 42 includes a generally spherical periphery having an opening 44 extending therethrough. At a position extending at right angles from the axis of the opening 44, the ball valve 42 has an integral exterior stem portion 46 which is rotatably mounted within an opening 48 formed in the wall of the tubular casing 32. Preferably, an O-ring seal 50 is mounted within a suitable exterior peripheral groove 50 in the valve stem 46 which O-ring seal engages the interior surfaces defining the opening 48. When the ball valve 42 is disposed in a position in which the axis of the opening 44 is aligned with the axis of the tubular casing 32, the ball valve is in an open position and the O-ring seal 40 serves to seal the outlet end of the opening 44. The inlet end of the opening 44 is supported by radially spaced segments 52 formed on the inner end of a tubular housing member 54 which is mounted with and is suitably fixed, as by welding or the like, to the tubular casing 32. The housing member 54 extends outwardly through the other pair of associated boss portions 30 and has an annular flange 56 extending radially outwardly from the free end thereof. Flange 56 serves to rotatably support a conventional female hose coupler 58 having a washer 60 mounted therein in accordance with conventional practice.

FIG. 12 illustrates a sill cock 62 of conventional construction, it being understood that the outlet of the sill cock is formed into a conventional male hose coupler (not shown) adapted to cooperate with the female hose coupler 58. When so connected, the female coupler 58 serves to fix the entire unit 12 to the sill cock in support relation. The female coupler 58 forms an inlet for receiving water under pressure from the sill cock and the male hose coupler 34 constitutes an outlet for the water under pressure which is controlled by virtue of the position of the ball valve 42.

Supported within the central portion of the housing assembly 16 is a valve moving mechanism, generally indicated at 64. The mechanism 64 comprises in general a tubular housing member or casing structure 66 within one end of which is mounted a direct current electric motor 68 of conventional construction. Mounted within the casing structure 66 between the electric motor 68 and the valve 42 is a gear reduction assembly, generally indicated at 70, which preferably is of the planetary type. The casing structure 66 is of stepped cylindrical configuration and is arranged so that its small end fixedly receives the electric motor 68 and its large end is open to receive the planetary gear assembly 70. As best shown in FIG. 2, the large open end is closed by an end closure 72. End closure 72 includes a forwardly projecting annular mounting flange 74 which is adapted to fit in keyed relation within a receiving annular flange 76 formed as an integral part of the casing 32 in surrounding coaxial relation with respect to the opening 48. As best shown in FIG. 4, the casing structure 66 is formed with a pair of diametrically spaced forwardly extending hooked arms 78 which are adapted to lockingly snap into sockets 80 formed in corresponding portions of the casing 32. The engagement of the hooked arms 78 within sockets 80 serves to hold the casing structure 66 and end closure 72 in fixed operative relation with respect to the casing 32. To further aid in supporting the casing structure 66 within the housing assembly 16, each housing section is formed with a pair of semi-annular support ribs 82 which support the casing structure 66 in accurately centered relation within the housing assembly.

As best shown in FIG. 2, the motor 68 includes an output shaft 84 which is suitably connected with a sun gear element 86 forming a part of the planetary gear reduction unit 70. Sun gear element 86 includes exterior spur gear teeth 88 which mesh with a plurality of planet spur gears 90. The outer periphery of the planet spur gears 90 mesh with interior orbit gear teeth 92 formed integrally on the associated interior portion of the casing structure 66. Planet gears 90 are rotatably supported on shafts 94 fixed to a carrier 96. Carrier 96 has formed integrally thereon a sun gear 98 which is rotatably mounted on a shaft 100, one end of which is rotatably carried within sun gear element 86 fixed to the end of the motor output shaft 84.

Carrier 96 with the associated shafts 94 and planet gears 90 and associated sun gear 98 constitutes one full stage of the planetary gear unit 70. As shown, there are two such full stages which simply repeat these parts. The sun gear 98 of the other planetary gear stage meshes with a series of planet gears 102 which are carried by shafts 104 fixed to a carrier 106. Carrier 106 has formed thereon, in lieu of the sun gear elements 98 previously described, a stub shaft section 108 which is interiorly bored to rotatably support the opposite end of the carrier and sun gear support shaft 100. As shown in FIG. 4, the exterior cross-sectional configuration of the shaft 108 is non-circular, as, for example, D-shaped so as to engage within a similarly shaped opening 110 formed in the valve stem 46.

As best shown in FIG. 4, the carrier 106 also includes a pair of diametrically opposed forwardly extending cam elements 112 which are adapted to cooperate with a switch 114 suitably mounted between the end closure 72 and the casing structure 66. Each cam element 112 has an angular extent of approximately 90° and is related to the position of the switch 114 such that the switch will be moved from one of its positions to the other when the ball valve 42 is moved into one or the other of its positions. An exemplary arrangement is one in which the switch is a normally opened switch which is moved into its closed position when the valve 42 is moved into its opened position. Conversely, when the valve 42 is moved into its closed position, the switch 114 is moved from its closed position into its opened position. The arrangement is such that the switch and valve have a 4-step cycle for each revolution of the valve. Beginning with the switch in its opened position and the valve in its closed position, the first step is for the valve to move 90° from its closed position into its opened position. The switch remains open until the end of the 90° valve movement at which time it is moved into its closed position. The second step is for the valve to move another 90° from its opened position into its closed position. During this 90° movement, the switch 114 remains in its closed position until the end of the movement at which time it moves into its opened position. Steps 3 and 4 are similar to steps 1 and 2 respectively. It will be understood that the transitions of the switch from opened to closed and closed to opened are utilized as signals in the control electronics hereinafter to be more fully described.

The switch 114 is electrically connected, together with the d.c. motor contacts, to the contacts of a 3-lead socket assembly 116 mounted in the end wall of the housing assembly 16, which is formed with a central opening 118 defining a plug receiving opening. The 3-lead socket assembly 116 is of conventional construction and is adapted to detachably receive a cooperating 3-lead plug assembly 120, also of conventional construction. As best shown in FIG. 1, the plug assembly 128 is carried in the central portion of an end wall 122 of a tubular housing support member 124. The housing support member 124 provides a cylindrical interior periphery which is adapted to supportingly fit over the cylindrical exterior periphery of the small diameter wall portions 20 of the housing assembly 16.

As best shown in FIGS. 1 and 2, each of the housing sections of the assembly 16 has formed on the transition wall portion 22 thereof a semi-annular ridge 126 spaced from a semi-annular abutment 128. Spaced from each ridge 128 in an opposite direction from the associated abutment 128 is a semi-annular groove 130. When the half sections of the housing assembly 16 are secured together, the annular groove formed by the semi-annular grooves 130 has an O-ring 132 mounted therein. The O-ring 132 is adapted to frictionally engage an interior cylindrical surface 134 formed on the opposite open end portion of the housing support member 124 in inwardly spaced relation from the free edge thereof. At the free edge the interior surface of the housing support member 124 is formed with a series of annular projections 136. The projections 136 are arranged to snap over the annular ridge defined by ridges 126 and ride in the annular groove defined between the ridges 126 and the abutment surfaces 128. In this way, the housing support member 124 is retained in supported relation on the exterior of the housing assembly 16 for rotational movement about the common axis of the exterior cylindrical periphery of the housing assembly 16 and the interior cylindrical periphery of the housing support member 124. The socket and plug assemblies accommodate this movement while retaining the electrical contact between the three leads of each assembly. The frictional engagement of the O-ring 132 with the cylindrical surface 134 serves to frictionally retain the housing support member 124 in any rotational position.

The housing support member 124 forms a part of a housing assembly, generally indicated at 138, of the portable programming unit 14. The housing assembly 138 also includes a pair of cooperating housing half sections 140 and 142. As best shown in FIG. 5, the section 140 includes a curved bottom wall 144 having an intermediate vertical wall 146 extending upwardly from one end thereof. A battery compartment wall 148 extends horizontally from the upper end of the vertical wall 146. The battery compartment is defined vertically by four peripheral walls 150 extending downwardly from the wall 148 and is closed by a removable flanged bottom wall 152. Batteries 154 are supported within the battery compartment so as to be connected electrically in accordance with conventional practice. The section 140 also includes outer side and end walls 156 extending downwardly from the side and end edges of the wall 148.

The housing section 142 includes a curved top wall 156 complementary to the curved bottom wall 144 and a recessed keyboard supporting wall 158 extending therefrom. The keyboard supporting wall 158 has side and end walls 160 extending downwardly therefrom which define an electronic component compartment. The keyboard supporting wall 158 also has a tubular boss 162 extending downwardly therefrom. Boss 162 receives a bolt 164 which extends through an appropriate bossed opening in the battery compartment wall 148 so as to fixedly secure the two housing half sections 140 and 142 together.

The curved top and bottom walls 156 and 144 define with the upper surface of vertical wall 146 a socket structure within which the housing support member 124 is mounted. As best shown in FIG. 5, the interior periphery of the curved top and bottom walls and the exterior periphery of the housing support member are formed with cooperating tongue and groove connections, as indicated at 166, in order to anchor the connection rotationally.

As best shown in FIG. 1, the end wall 122 of the housing support member 124 is formed with an annular mounting flange 168 for snugly receiving a housing cap 170 having a grommet 172 through which an electrical wire extends connecting the batteries 154 and the electronic components in the electronic component compartment with the plug assembly 120. The cap 170 is enclosed within the housing assembly 138 by end walls 174 and 176 extending from the bottom wall 144 and top wall 156 respectively.

The keyboard supporting wall 158 supports a laminated keyboard assembly, generally indicated at 178, which includes 6 keys designated as follows, a water off-on key 180, an add 1 hour key 182, an add 1 minute key 184, a time of day key 186, a start time key 188, and a run time key 190. In addition, the keyboard supporting wall 158 is formed with a rectangular opening 192 within which is mounted a display 194. The display 194 preferably is a liquid crystal display of known construction suitable to display the time of day. Along each side of the keyboard wall 158 there is formed a pair of undercut rails 196 which serve to slidably receive a removable cover 198 for the keys and display 194.

In the operation of the apparatus 10, female hose coupler 58 of the water control unit 12 is threadedly engaged on the male hose coupler of the sill cock 62. The housing assembly 16 of the unit 12 is, in this way, fixed in supported relation on the sill cock. The male hose coupler 34 can then be connected to the female hose coupler of a hose the opposite end of which is connected with a sprinkler.

The portable programming unit 14 is completely removable from the unit 12 and of a size to enable the user to conveniently hold it while viewing the keys and display at an appropriate eye proximity. To program the unit 14, the user first pushes the time of day key 186 and by keys 182 and 184 sets the correct time of day on the display 194. Next, the start time key 188 is pressed, and again the keys 182 and 184 are pressed to set the time of day when the watering cycle is to commence. Next, the operator presses the run time key 190 and again sets the number of hours and minutes on the display 194 it is desired to continue the watering cycle. Any run time up to 11:59 hours can be chosen.

It will be noted that the keys are such that once a program has been set in the manner indicated above, the operator can push any one of the keys 186, 188, and 190; and when these keys are pushed, the display 194 will show the hours and minutes previously set during the programming. If desired, the time of day button 186 can be pressed last so that the display 194 becomes effectively a clock.

Preferably, the display itself gives an indication of which of the 3 keys, 186, 188, and 190 has been pressed last. If the display is showing the time of day, the colon between the hours and minutes blinks every ½ to 1 second. If the display is showing start time, the colon is on continuously. If the display is showing run time, the colon is on continuously and a.m. and p.m. are off.

The simple 3-step programming described above is sufficient to enable the programming unit 14 when docked with the unit 12 to effect the watering cycle at the time set for the number of hours and minutes set. In docking the unit 14 on the unit 12 the interengagement of the plug assembly 120 with the socket assembly 116 provides the electrical connection between the two units, and the fitting of the housing support member 124 over the cylindrical wall of the housing structure 16 provided by wall portions 20 serves to support the portable programming unit 14 on the fixed water control unit 12. As previously indicated, the arrangement permits the unit to be maintained in any angular position.

When the programming unit 14 is docked upon the fixed unit 12 and the valve 42 of the unit 12 is in its closed position, the operator can push the water on-off key 180 and the valve 42 will be moved through the operation of the motor 68 and planetary gear reduction assembly 70 from its closed position into its opened position. The water will remain on for a preset time, as for example, 15 minutes and be turned off automatically. At any time when the water is on, the operator can push the key 180 and the water will be turned off.

With the above in mind, and with reference to FIGS. 6 through 11, the electronic components which are utilized to effect the operation in response to the pushing of the keys and the manner in which these components act to effect the functions will now be described.

As best shown in FIG. 6, the heart of the electronic component hardware is a 8048 microcontroller 200 which may be, for example, the 8048 microcontroller manufactured by Intel. This particular microcontroller includes not only a central processing unit but also random access memory, read only memory and a sufficient number of input and output ports to enable connection to all necessary component elements as described below.

Thus, a battery level sensor 202 provides a signal to microcontroller 200 when batteries 154 powering the circuitry reaches a dangerously low level. As will be described below, when the battery level sensor 202 generates a signal, the keyboard 178 and all automatic functioning are disabled, the valve 42 is closed and the display is turned off.

Microcontroller 200 provides a signal to a driver 204 which, in turn, powers motor 68 to adjust the valve 42. As has been described above, the position of the valve 42 is monitored by cam activated switch 114 which changes state every time the valve 42 turns 90°. Microcontroller 200 controls display 194 through a liquid crystal display driver 212. Finally, microcontroller 200 interacts with keyboard 178 to determine when a key has been depressed.

Figure 7:
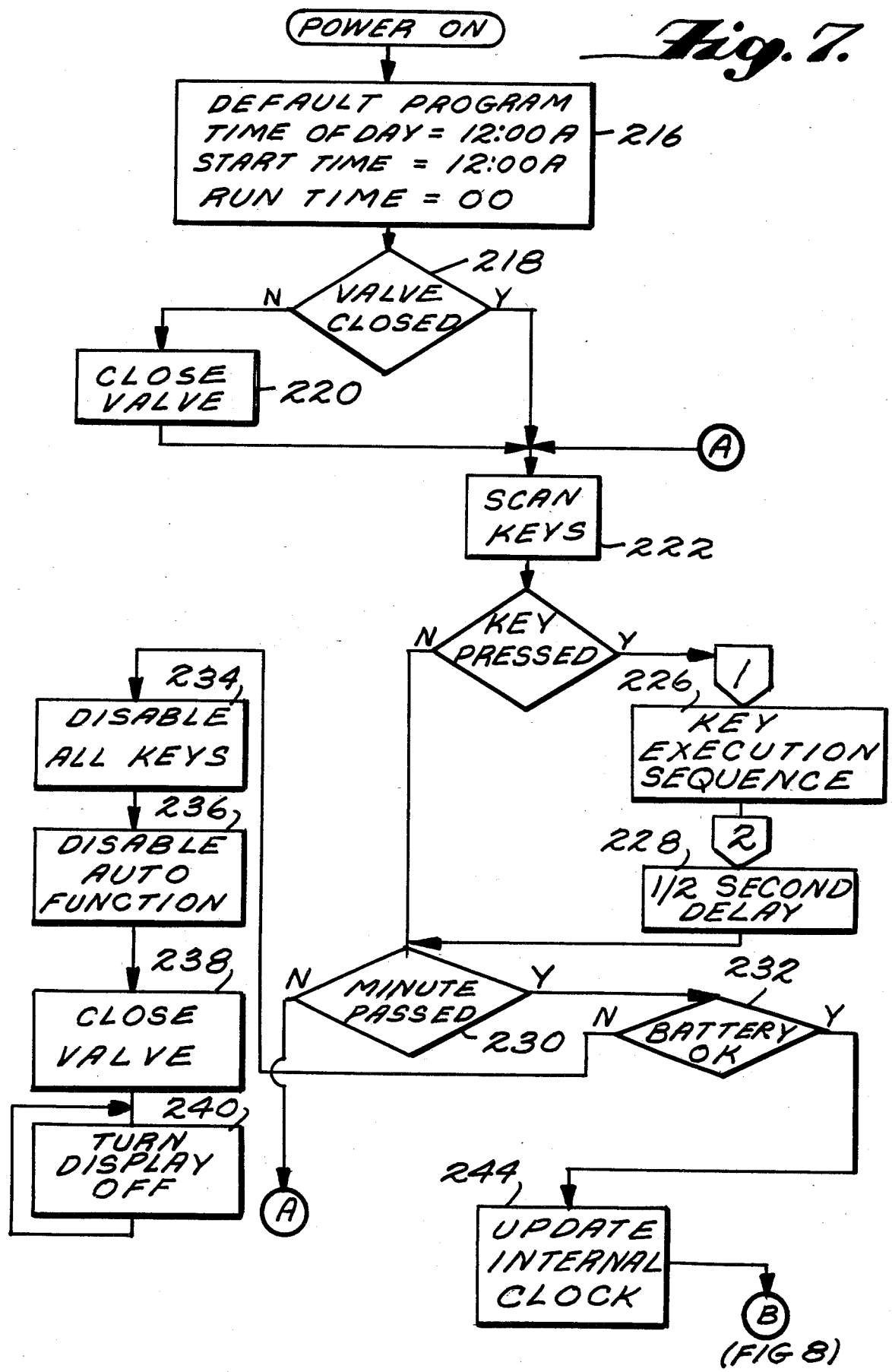
FIGS. 7 and 8 represent a flow diagram of the main program for the microprocessor of the programming unit shown in FIGS. 1–5.
Figure 8:
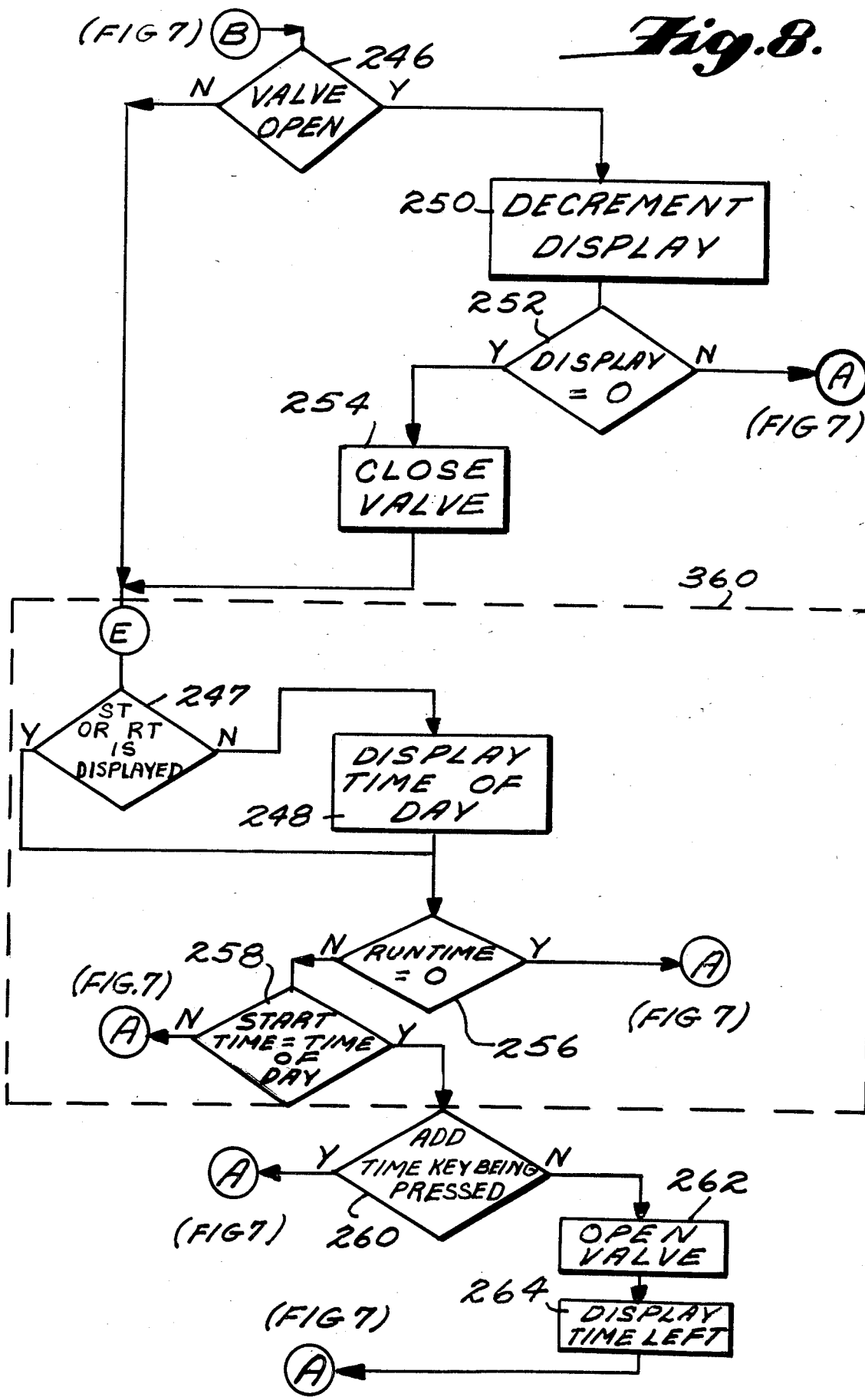

To automatically control sprinkling, microcontroller 200 performs a program stored in its internal read only memory. A flow chart for the main program is illustrated in FIGS. 7 and 8. As illustrated in FIG. 7, when power is turned on, a default program is entered at step 216. Thus, the time of day is set to 12 o'clock midnight, the start time for the watering cycle is set to 12 o'clock midnight and the run time is set for zero minutes. As a result, the sprinkler will never be turned on. Next, at step 218, microcontroller 200 determines whether the valve 42 is closed. If it is open, microcontroller 200 closes the valve 42 at step 220.

After this initializing has occurred, microcontroller 200 begins a key scan operation at step 222. Thus, at step 224, it is determined whether a key of keyboard 178 has been depressed. If so, a key execution sequence subroutine is performed at step 226. This subroutine will be described below with respect to FIGS. 9 through 11. Essentially, this subroutine processes all data received through the keyboard 178. After the subroutine is finished, step 228 introduces a half second delay before further processing occurs.

Microcontroller 200 includes a counter which reaches a predetermined count when one minute has passed. At step 230, it is determined whether a minute has passed since the previous initialization of that counter. If a minute has not passed, processing returns to the key scanning sequence at step 222. If a minute has passed, then the counter is reset and processing passes to step 232 where it is determined whether or not battery level sensor 202 is indicating the battery has an acceptable power level. If the battery does not have an acceptable power level, all of the keys of keyboard 178 are disabled at step 234, the automatic functioning of the timer is disabled at step 236, the valve 42 is closed at step 238, and the display is turned off at step 240 until power is first turned off and then turned back on, in which case processing resumes with step 216.

If it is determined at step 230 that a minute has passed since the internal counter in microcontroller 200 has been reset and it is determined at step 232 that the batteries 154 are functioning properly, the internal clock in microcontroller 200 that maintains an indication of the time of day in hours and minutes is updated at step 244. At step 246 in FIG. 8, microcontroller 200 determines whether the valve 42 is open. If it is not open, and the start time or run time is not displayed at step 247 then the time of day is displayed at step 248. If the start time or run time is displayed at step 247, processing continues at step 256. If step 246 determines that the valve 42 is open, display 194 is then providing an indication of the amount of time left during a sprinkling period. This display is decremented by one minute in step 250. After decrementation, step 252 determines whether the display has been decremented to zero. If so, the sprinkling period has ended so that at step 254, the valve 42 is closed, at step 247 the start time or routine is not displayed and at step 248, the time of day is displayed. If at step 252 it is determined that the sprinkling period is not over, then processing returns to the key scan sequence at step 222 in FIG. 7.

After processing of step 248 occurs, it is necessary to determine whether the valve 42 should be opened. Accordingly, at step 256, it is determined whether a run time has been programmed into the controller. If no run time has been programmed, then the valve 42 cannot be opened. Accordingly, if the determination at step 256 is positive, processing returns to the key scan sequence beginning with step 222 in FIG. 7. However, if a run time has been programmed, then processing passes from step 256 to step 258 at which it is determined whether the start time that has been programmed is the same as the present time of day. If this determination is negative, then the state of the valve 42 should not be changed and processing returns to the key scan sequence at step 222.

If the start time is the same as the present time of day, then processing proceeds to step 260 at which it is determined whether either of the add time keys (add minute key 184 and add hour key 182) are being depressed. If either of the add time keys are being depressed, then it is not appropriate to open the valve 42 so that processing returns to key scan step 222 in FIG. 7.

If the start time is the same as the time of day as determined in step 258 and the add time keys are not being depressed as determined in step 260, then the valve 42 is opened at step 262. At step 264, the run time that remains is displayed on display 194. Processing then returns to key scan step 222 in FIG. 7.

Eventually, the run will be completed, at which time the display will be "zero". Then, the determination at step 252 in FIG. 8 will be positive so that the valve 42 is closed at step 254.

As mentioned above, the key execution subroutine performed at step 226 in FIG. 7 processes data entered by means of keyboard 178 in view of keys that had previously been depressed and the state of the controller. This subroutine is illustrated in FIGS. 9 through 11. Upon entry of this subroutine, step 266 in FIG. 9 causes the display to blink, acknowledging depression of a key. Step 268 determines whether water on-off key 180 has been depressed. If so, step 270 determines whether the water valve 42 is opened or closed. If step 270 determines that the valve is open, then at step 271, the valve is closed and at step 272 the time of day is displayed in display 194. Thus, water on-off key 180 can be employed to end sprinkling at any time, independent of the state of the controller.

If step 270 determines that the water is not on, then at step 273 the water valve 42 is opened. At step 274, the run time within microcontroller 200 is set for 15 minutes and at step 276, 15 minutes is displayed on display 194. Thus, when water on-off key 180 is depressed to begin watering, the controller automatically creates a preset cycle time.

If step 268 determines that water on-off key 180 has not been depressed, it is next essential to determine whether the valve is opened or closed at step 278. If the valve is opened, then the controller will acknowledge only depression of add hour key 182 and add minute key 184. Assuming that the valve is closed, it is next determined at step 280 whether time of day key 186 has been depressed. If so, the time of day is displayed at step 282 and the key execution subroutine ends.

If, at step 280, it is determined that time of day key 280 has not been depressed, microcontroller 200 determines at step 284 whether start time key 188 has been depressed. If it has, the start time is displayed in display 194 at step 286. If start time key 188 has not been depressed as determined at step 284, then processing passes to step 288 which determines whether run time key 190 has been depressed. If it has been depressed, the run time is displayed at step 290.

If step 288 determines that run time key 190 has not been depressed or step 278 determines that the valve 42 is open, microcontroller 200 next determines whether add hour key 182 has been depressed at step 292. A positive determination causes processing to pass to step 294 where it is determined whether the time of day is presently being displayed. Note that the time of day is displayed after time of day key 186 has been depressed in accordance with steps 280 and 282. Thus, if the determination at step 294 is positive, the time of day is being set. Accordingly, at step 296, it is determined whether the hour portion of the time of day prior to updating is 11. If this determination is positive, the hour is updated to 12 at step 298, and the AM/PM designation is reversed at step 300 before the key execution subroutine ends. If it is determined at step 296 that the hour portion of the time of day is not 11, step 302 determines whether the hour portion of the time of day is 12. If so, step 304 advances the hour portion of the time of day to 1 before the key execution subroutine ends. If the determinations at steps 296 and 302 are both negative, then step 306 causes one hour to be added to the hour portion of the time of day before the key execution subroutine ends.

If step 294 determines that the time of day is not being displayed, indicating that depression of add hour key 182 in step 292 is not intended to update the time of day, processing passes to step 308 in FIG. 10, at this step, it is determined whether the start time is being displayed, indicating that depression of add hour key 182 is intended to increment the start time. If step 308 determines that the start time is being displayed, then the procedure that is followed is identical to steps 296 through 306 in FIG. 9 when it is determined that the time of day is displayed, except that it is the start time that is updated or set.

If it is determined at step 292 (FIG. 9) that add hour key 182 has been depressed, but it is determined that neither the time of day nor the start time is being displayed at steps 294 (FIG. 9) and 308 (FIG. 10), processing passes to step 310 at which it is determined whether the run time (as opposed to the run time left) is being displayed. The run time is displayed only in response to depression of run time by key 190 as detected in step 288 (FIG. 9). If this determination is positive, step 312 determines whether the hours portion of the run time is 11. If it is not 11, the hours portion of the run time is incremented by one hour at step 314 before the key execution subroutine ends. The maximum run time that can be set is 11 hours 59 minutes. Accordingly, if the determination at step 312 is positive, indicating that prior to incrementation, the hours portion of the run time is at 11 hours, incrementation would cause the run time to exceed 12 hours. Therefore, at step 318, the hours portion is reset to zero and the hours portion of the run time is blanked in display 194. This ends the key execution subroutine.

The determination at step 310 will be positive only when run time key 190 was previously depressed as detected in step 288. Thus, step 312 will be executed only if add hour key 182 is depressed immediately after run time key 190. If, it is determined at step 310 that the run time is not being displayed in response to depression of run time key 190, the display must be displaying either nothing or the run time left while a run is in progress. Therefore, at step 320 it is determined whether the valve 42 is opened. If the valve is closed, and neither the time of day, start time nor run time is being displayed, then depression of add hour key 182 should have no effect so that the key execution subroutine is ended. However, if the valve 42 is opened as determined at step 320, it means that a run is in progress and, in fact, the run time left is being displayed.

In this situation, it is possible, in the preferred embodiment, to increase the run time by depressing add hour and add minute keys 182 and 184, respectively. Accordingly, at step 322, it is determined whether the run time left hours equals 11. If the determination is negative, the hours portion of the run time left is incremented by one in step 324. If the hours portion of the run time left is 11 as determined in step 322, incrementation by one hour would cause the total run time left to exceed 12 hours, which, as explained above, is not permitted in this embodiment. Accordingly, at step 328, the hours portion of the run time left is set to zero.

At step 330, it is determined whether display 178 shows the run time left being zero. If the run time left is not zero, the key execution subroutine ends. If the display does show a run time left of zero, step 332 closes the valve 42 before the key execution subroutine ends.

The discussion above is predicated upon detection of depression of add hour key 182 at step 292 in FIG. 9. If, at step 292, it is determined that add hour key 182 has not been depressed, processing proceeds to step 334 in FIG. 11 at which it is determined whether add minute key 184 has been depressed. If it has not, then no key has been depressed and the key execution subroutine ends. However, if add minute key 184 has been depressed, step 336 determines whether the time of day is being displayed, indicating that it is the time of day that is to be updated. If this determination is positive, step 338 determines whether the minutes portion of the time of day is 59. If not, step 340 adds one minute to the time of day before the key execution subroutine ends. If step 338 determines that the minutes portion of the time of day is 59, then step 342 sets the minutes portion of the time of day to zero. Note that the hour portion is unchanged. Thus, if the time of day is initially 5:59, depression of add minute key 184 will cause the time of day to go to 5:00. To change the hour portion of the time of day, it is necessary to depress add hour key 182.

If step 336 determines that the time of day is not being displayed, step 344 determines whether the start time is being displayed, indicating that it is the start time that is being updated. If this determination is positive, a procedure is followed identical to steps 338 through 342.

If add minute key 184 has been depressed as determined by step 334, but neither the time of day nor start time is being displayed as determined at steps 336 and 344, step 346 determines whether the run time is being displayed. If so, a procedure is followed identical to steps 338 through 342.

If the run time is not being displayed as determined by step 346, either nothing is being displayed or the run time left is being displayed while a run is in progress. Therefore, it is determined at step 348 whether the valve 42 is opened. If the valve 42 is closed, then depression of the add minute key 184 should have no effect so that the key execution subroutine ends.

If step 348 determines that the valve 42 is opened, it means that the display is presently displaying the time left during a run. At step 350, it is determined whether the minutes portion of the run time left is 59 minutes. If it is not, a minute is added to the run time left at step 352. If step 350 determines that the minutes portion of the run time left is 59, at step 354, the minutes is reset to zero, but the hour is left unchanged. Step 356 determines whether resetting the minutes portion of the display has caused the display to show zero time left to run. If it does, the valve is turned off at step 358. This ends the key execution sequence, and thus the entire program for the 6-key embodiment of the present invention.

Referring now more particularly to FIG. 12, there is shown therein an extension cord accessory, generally indicated at 360, which is adapted to be interconnected between the units 12 and 14 of the apparatus 10 so as to render the programming unit 14 capable of not only being programmed while in a remote position with respect to the water control unit 12 fixed to the sill cock but also of operating the unit 12 from a remote position, as well. The extension cord accessory 360 includes a socket unit, generally indicated at 362, adapted to connect electrically and mechanically with the water control unit 12 in the same fashion as the programming unit 14, a length of 3 lead wire 364 extending from the socket unit 362 and a plug unit 366 connected with the other end of the wire 364 and adapted to connect electrically and mechanically with the programming unit 14 in the same fashion as the water control unit 12.

As shown, the socket unit 362 consists essentially of a tubular member 368 having an end wall 370 closing one end thereof within which is mounted a plug assembly 372 which, in turn, is covered by a cap 374. Member 368, plug assembly 372 and cap 374 are substantially identical in construction to the member 124, plug assembly 120 and cap 170 previously described. Consequently, the socket unit 362 is capable of being removed from the unit 12 or docked therewith, as shown in FIG. 12. When docked, plug assembly 372 connects electrically with socket assembly 116, and member 368 includes interior projection portions 376 which serve to detachably rotatably support the socket unit 362 on the unit 12 as by cooperating with the ridge 126 and abutment surface 128 thereof and an interior cylindrical surface 378 disposed inwardly of the projecting portions 376 for retaining the socket unit 362 in any desired position of rotational movement, as by frictional engagement with O-ring 132. Also, as before, cap 374 includes a rubber grommet 380 allowing the wire 364 to pass outwardly therethrough after the 3 leads thereof have been suitably electrically connected with the plug assembly 372.

The plug unit 366 consists essentially of two similar housing half sections 382 and 384 suitably welded together to provide a structure which is substantially identical to structure of the housing assembly 16 disposed outwardly from the large diameter peripheral wall portions 18 thereof. The main body of each half section is semi-cylindrical in configuration; being closed at one end with a semi-circular end wall 386. End walls 386 are formed with a central access opening 388 which leads to a socket assembly 390 carried by the end walls 386. Socket assembly 390 is substantially identical to socket assembly 116 previously described.

Formed on the other end of the half section 382 is a flat mounting flange 392 which serves to mount the plug unit 366 in stable relation on any flat horizontal surface. Mounting flange 392 is suitably apertured to receive fasteners 394 which serve to secure the plug unit 366 on a vertical wall surface.

Plug half sections 382 and 384 also provide end walls 396 at the mounting flange ends thereof which provide an annular abutment surface 398. An exterior annular ridge 400 is formed inwardly of the annular abutment surface 398 and an exterior annular groove 402 is formed inwardly of the annular ridge 400. Annular groove 402 receives an O-ring 404. Abutment surface 398, ridge 400 and O-ring 404 correspond with abutment surface 128, ridge 126 and O-ring 132 previously described and perform identical functions with respect to the projections 136 and interior cylindrical surface 134 of the portable programming unit 14. It can thus be seen that the programming unit 14 is capable of being removed and docked with respect to the plug unit 366 in precisely the same manner as it is with fixed water control unit 12.

Referring now more particularly to FIG. 13, there is shown therein a whole lawn above-ground watering system, generally indicated at 410. The system 410 preferably includes apparatus, generally indicated at 10A, which is similar to the apparatus 10 previously described. The apparatus 10A includes a sill cock mounted water control unit 12 and a cooperating portable programming unit 14A which is the same as the programming unit 14 previously described, except that it includes a modified keyboard 178A. As shown, the modified keyboard 178A includes 12 keys rather than the 6 keys previously described. Included among the 12 keys are 6 keys similar to the keys 180, 182, 184, 186, 188, and 190 previously described. Thus the 12-key keyboard 178A includes a water on-off key 180A, an add one hour key 182A, an add one minute key 184A, a time of day key 186A, a start time 1 key 188A, a run time 1 key 190A. The six additional keys include an every N day key 412, a start time 2 key 414, a run time 2 key 416, a start time 3 key 418, and a run time 3 key 420 and a timer on-off key 417.

In the operation of the programming unit 14A, the first 6 keys, which are common to the 6 keys of the unit 14 previously described, operate in the same fashion. The start time 2 and run time 2 keys 414 and 416, like the start time 1 and run time 1 keys 188A and 190A, operate to determine the time limits of a second watering cycle. The start time 3 and run time 3 keys 418 and 420, like the start time 1 and run time 1 keys 188A and 190A, operate to determine the time limits of a third watering cycle. The every N day key 412 operates to determine whether the watering cycle will be repeated every day, every other day, every second day, and so on up to every 7th day.

The program for the 12-key unit 14A is so similar to the program for the 6-key unit 14 that instead of completely illustrating and describing the flow chart for the 12-key unit 14A, only the modifications necessary to convert the flow chart for the 6-key unit 14 into the flow chart for the 12-key embodiment will be discussed.

FIG. 14 illustrates the only change that is necessary with respect to the main program illustrated in FIGS. 6 and 7 to cause FIGS. 7 and 8 to represent the main program for the 12-key embodiment. Thus, if FIG. 14 were substituted for section 360 in FIG. 8, FIGS. 7 and 8 would represent the main program for the 12-key unit 14A. It will be recalled from above that the 12-key unit 14A differs from the 6-key unit 14 in that as many as three separate watering cycles or runs may be independently programmed during a watering day. Also, in the 12-key unit 14A, the number of days between watering days may be set as well as a timer on-off function. The flow chart illustrated in FIG. 14 determines whether any of the three watering cycles or runs should be in progress.

Thus, proceeding from E in FIG. 8, if the timer is determined to be off at step 421, "off" is displayed in display 194 at step 423 and processing proceeds to the key scan sequence at step 222 in FIG. 7. If the timer is not off at step 421, and the start time or run time is not being displayed at step 247, the time of day is displayed at step 248 and processing continues to step 422. If the start time or run time is displayed at step 247, processing continues directly to step 422. Step 422 determines whether the present day is a day on which watering is to occur. If it is not, processing returns to the key scan sequence at step 222 in FIG. 7. If today is a watering day, processing proceeds to step 424 where the first possible watering cycle is examined. Specifically, it is determined whether the run time for watering cycle 1 is zero. If it is zero, then clearly the first watering cycle is not to be started. However, if step 424 determines that the run time for watering cycle 1 is not zero, step 426 determines whether the start time for the first watering cycle is equal to the present time of day. If it is, processing proceeds to step 260 in FIG. 8 which may ultimately result in the valve 42 being opened.

If step 424 determines that the run time for the first cycle is zero or step 426 determines that the start time for the first cycle is not the same as the present time of day, step 428 determines whether the run time for the second watering cycle is zero. If it is not, step 430 determines whether the start time for the second cycle is the same as the present time of day. If it is, processing proceeds to step 260 in FIG. 8 after which the valve 42 may ultimately be opened.

If step 428 determines that the run time for the second water cycle is zero or if step 430 determines that the start time for the second cycle is not the same as the present time of day, processing proceeds to step 432 in which it is determined whether the run time for the third cycle is zero. If it is, processing returns to the key scan sequence at step 222 in FIG. 7. If the run time for the third cycle is not zero, microcontroller 200 determines at step 434 whether the start time for the third watering cycle is the same as the present time of day. If it is not, processing proceeds to the key scan sequence at step 222 in FIG. 7. If step 434 determines that the start time for the third watering cycle is the same as the present time of day, processing proceeds to step 260 in FIG. 8.

These are the only changes necessary to convert the main program illustrated in FIGS. 7 and 8 into the main program for the 12-key unit 14A. Similarly simple changes are all that is necessary to convert the key execution subroutine illustrated in FIGS. 9 through 11 into the key execution subroutine for the 12-key unit 14A.

Thus, keep in mind that the 12-key unit 14A enables the start and run times for 3 separate watering cycles to be entered. Steps 308 and 310 in FIG. 10 must be considered as determining whether the start time and run time for each particular cycle n is being displayed. Similarly steps 284 and 288 in FIG. 9 must be considered as determining whether the start time and run time for each particular cycle n is being displayed. Then, the incrementation of the hours portion of these times is for the particular sprinkling cycle n. Similarly steps 344 and 346 in FIG. 11 determine whether the run time or start time for each cycle 7 is being displayed. It is then the start time or run time for that particular watering cycle which is incremented by depression of add minute key 184A.

With the 12-key unit 14A, it is possible to control the number of days between watering by the use of every n day key 412. After this key is depressed, a number can be entered employing add minute key 184A which controls how many days occur between watering. It is necessary to modify the key execution sequence of FIGS. 9 through 11 to determine when every n day key 362 has been depressed. Accordingly, instead of proceeding directly from a positive determination at step 278 to step 280 in FIG. 9, it is necessary to insert the processing illustrated in FIG. 15. Thus, after a positive determination at step 278, microcontroller 200 determines at step 435 whether timer on-off key 417 has been depressed. If this key has been depressed, step 437 determines whether the timer is on. If it is, processing continues to step 441 where auto functions are disabled and "off" is displayed. The key execution sequence then ends. If at step 437 the timer is determined not to be on, auto functions are enabled and the time of day is displayed at step 439. The key execution sequence then ends. If at step 435, the timer on-off key was determined not to have to been depressed, processing continues to step 443 where, if the timer is determined to be off, the key execution sequence ends. If at step 443 the timer is not off, microcontroller 200 determines at step 436 whether every n day key 412 has been depressed. If this key has been depressed, step 438 causes the number n to be displayed before the key execution sequence ends. If step 436 determines that every n day key 412 has not been depressed, processing passes to step 280 in FIG. 9.

It is also necessary, as suggested above, to modify the key execution subroutine in order to increment the number n of days separating two successive watering cycle days. Thus, instead of ending the key execution sequence with a negative determination at step 348 in FIG. 11, processing passes to step 440 in FIG. 16. Recall that processing will proceed to this point only if add minute key 184A has been depressed but neither the time of day, start time nor run time is being displayed and the valve 42 is closed. Under these conditions, either the day number n or nothing is being displayed. If the day number n is not being displayed, the key execution sequence ends. However, if the day number n is being displayed, step 442 determines whether the day number n is equal to 7. If it is not, step 444 causes the day number n to be incremented before the key execution sequence ends. If step 442 determines that the day number n is equal to 7, step 446 resets the day number n to 1 before the key execution sequence ends. These are all of the changes that are necessary to convert the key execution subroutine illustrated in FIGS. 9 through 11 for the 12-key unit 14A.

While the additional capabilities of the 12-key unit 14A could be utilized with a single sprinkler, they are particularly desirable in the system 410 which also includes a portable stepping valve unit 450. In accordance with the principles of the present invention the portable stepping valve unit 450 includes a housing assembly, generally indicated at 452. As shown the housing assembly 452 is supported on a U-shaped lawn engaging runner 454. It will be understood that other known lawn supporting means such as wheels, spikes or the like may be utilized, if desired. Housing assembly 452 includes a female hose coupler 456 constituting an inlet. In the system 410 shown, a length of hose 458 is connected between the male hose coupler 34 of the sill cock mounted unit 12 and the female hose coupler 456 of the stepping valve unit 450.

The housing assembly 452 also includes three male hose couplers 460, 462, and 464. It will be understood that two or more than three outlets in the form of male hose couplers can be provided. In the system 410 shown in FIG. 13, three outlets are shown, since this number corresponds to the number of watering cycles per day which can be programmed into the programming unit 14A. In the system 410 shown, the three outlets 460, 462, and 464 are connected with three separate sprinklers 466, 468, and 470 respectively, by three separate lengths of hose 472, 474, and 476 respectively. Mounted within the housing assembly 452 is a mechanism 478 adapted to operate during each cycle of movement of the valve 42 consisting of a first movement from its opened position into its closed position and a second movement from its closed position into its opened position for communicating the inlet female hose coupler 456 with a successive one of each of the three outlet male hose couplers 460, 462 and 464 during the time of the cycle when the valve 42 is in its opened position. This mechanism 478 may take various known forms. An exemplary form is disclosed in U.S. Pat. No. 4,316,480, the disclosure of which is hereby incorporated by reference into the present specification. The patent also references several other patents, namely; Nos. 3,369,565; 3,785,391; 3,924,652; 4,034,775; and 4,125,124; and the disclosure of these patents are likewise incorporated by reference into the present specification.

As best shown in FIG. 17, the housing assembly 452 includes an inlet section 480, an intermediate section 482, and an outlet section 484. The intermediate section 482 comprises a first chamber 486 and a second chamber 488 which is cylindrical and open at one end, the first and second chambers being connected by a cylindrical opening 490 which is coaxial with the cylindrical chamber 488. The inlet section 480 has coupler 456 at one end and an opening 492 at the other end connecting it to the first chamber 486 of the intermediate section 482.

The outlet section 484 is connected to the bottom of the intermediate section 482 at the open end of cylindrical second chamber 488 by a quick connect-disconnect mechanism 494. Male hose couplers 460, 462, and 464 are in the outlet section 484. An anti-siphon mechanism 496 is located on the intermediate section 482 which permits air to be drawn into chamber 488 whenever a suction occurs therein.

A distributing valving member 498 is coaxially mounted in chamber 488. Valving member 498 includes at least one port 500 which may be selectively indexed to come into register with one of the three outlet ports leading to the outlet male hose couplers 460, 462, and 464. In FIG. 17, one outlet port 502 is shown which leads to outlet male hose coupler 460.

The valving member 498 is connected by a rod 594 to a piston valve arrangement 506.

The piston valve arrangement 506 comprises a circular flange 508 which is coaxially mounted with cylindrical opening 490 and is arranged to overlap a flat annular surface 510 located around the cylindrical opening 490 on the side which engages cylindrical chamber 488. The circular flange 508 has an annular valve sealing member 512 positioned around its outer surface for engaging the flat annular surface 510 when the piston arrangement 506 is biased upwardly.

The piston arrangement 506 includes a rod extension 514 which extends upwardly above the flange 508 and in line with rod 504. This rod has longitudinally spaced cam followers 516 and 518 which engage cam mechanisms 520 mounted around the inner surface of an indexing cylinder 522. Cylinder 522 extends through an opening in the top of intermediate section 482 and is fixed to the top of the housing by an integral flange 524 and bolts 526.

The cam followers 516 and 518 are longitudinally spaced along and circumferentially offset on rod 514 so that as rod 514 and hence cam followers 516 and 518 commence their downward stroke from their FIG. 17 position, cam follower 516 will contact a cooperating upper face of a cam mechanism 520 causing cam follower 516 to rotate as it translates or reciprocates, therefore also causing rod 504 and valving member 498 to rotate. This action places the port 500 in alignment with one of the outlet ports of the outlet section 484 so that water can flow through port 500 and its aligned outlet port. As the cam followers 516 and 518 return to their FIG. 17 position, cam follower 518 will then engage a cooperating lower face of a cam mechanism 520 causing cam follower 518 to rotate as it translates or reciprocates, upwardly therefore also causing rod 504 and valving member 498 to rotate so that the port 500 will be rotated towards its next outlet port to be engaged when the mechanism is again moved downwardly. Other camming arrangements can be used, and one is shown in U.S. Pat. Nos. 3,460,560; 3,524, 470; and 3,924,652, to obtain step-by-step sequencing with reciprocation.

The piston arrangement 506 has its piston basically formed as a cylinder 528 which extends upwardly from the circular flange 508, between the outer surface of the indexing cylinder 522 and the inner surface of the cylindrical opening 480 into the first chamber 486. It is to be noted that the opening 490 could be extended in length with a valve seat therein such as shown in U.S. Pat. No. 4,125,124 with the circular flange 508 fitting within the extended opening 490 and having an annular sealing member for engaging the valve seat.

The lower end of rod 504 is connected to distributing valve member 498 through a slide connecting joint 530 wherein limited axial sliding movement is permitted by the rod 504 and distributing valve member 498 and relative rotation between rod 504 and valving member 498 is prevented. The slide connecting joint 530 includes a sleeve member fixed in the valving member 498 which includes an upper sleeve 532 and a larger lower sleeve 534. A flange member 536 projects outwardly from the bottom end of the rod 504 to have slidable movement within the larger sleeve 534, and the rod 504 is keyed in the sleeve 532. It can be seen that the flange member 536 limits the downward movement of distributing valving member 498 with relation to the rod 504 since it will engage the annular abutment formed by the upper and lower sleeves 532 and 534. This connection also provides a positive unseating force for valve member 438 when the rod is moved upwardly. The connecting means between the rod 504 and the distributing valve member 498 is the same as shown in U.S. Pat. No. 4,125,124, referred to above.

The piston arrangement 506, rod extension 514, rod 504, and valving member 498 are biased to their position shown in FIG. 17 by a biasing mechanism 538. This mechanism comprises a rod 540 having a piston 542 fixed to the lower end thereof. The rod 540 is placed in a mating bore 544 located up the center of rod 504. The mating bore 544 is shown extending to approximately the location of the flange 508. A ball 546 is located between the end of the rod 540 and the bottom of the mating bore 544. Piston 542 is located in a bore 548 in the outlet section 480 at the center of the outlet ports. A seal ring 550 is positioned around the outer circumference of piston 542 for engaging the side of the bore 548 to prevent any leakage of fluid thereby. A spring 552 is positioned between the bottom of the bore 548 and the facing bottom of the piston 542. An opening 554 opens the bottom of the bore to atmosphere so that a fluid will not become trapped therein and prevent the free movement of piston 542 when it is operating in this mode.

It can be seen that as water under pressure enters inlet coupler 456 and passes from inlet section 488 to the first chamber 486 of the intermediate section 482, the water will act on the piston valve arrangement 506 moving it downwardly when the force can overcome the force provided by the spring 552. At that point, the cam follower 516 moves downwardly to engage the cooperating face of cam 520 and the port 500 is aligned with the next outlet port and the water is permitted to flow past the upper end of the cylinder 528. It is noted that the length of the cylinder 528 is made so that as the valve member 498 has its lower surface engage the outlet ports, the upper end of the cylinder 528 will be positioned to permit water flow through the cylindrical opening 450 into the chamber 488 where it can flow out the port 500. When the water under pressure is turned off at valve 42, the force provided by the spring 552 will act on the piston valve arrangement 506 to move it upwardly and place the sealing member 512 against the annular surface 510 closing the opening 490. At the same time, the cam follower 518 moves upwardly to engage the cooperating face of cam 520 and the port 500 is rotated towards the next outlet port to be engaged when the mechanism is again moved downwardly when valve 42 is opened and water under sufficient pressure enters inlet coupler 456.

It can thus be seen that once the 11 key unit 14A has been properly programmed to receive three separate watering cycles, the stepping valve unit 450 will operate to cause each one of the three watering cycles to be performed by one of the three sprinklers 466, 468, and 470. Moreover, these three separate sprinkling cycles will be repeated every n days wherein is an integer from 1 to 7 depending upon the set of the every n day key 412.

While the system 410 shown in FIG. 13 is preferred, it is within the contemplation of the present invention to eliminate the runner 454 from the unit 450 and connect the female inlet hose coupler 456 of the unit 450 directly on the male outlet hose coupler 34 of the water control unit 12. In this case, both of the units 12 and 450 are effectively mounted together in supported relation on the sill cock 62. Stated differently, the housings of both units when so interconnected effectively become a single housing structure providing a single female inlet hose coupler 58 and a plurality of male outlet hose couplers 460, 462 and 464, with the female coupler 58 serving to connect the entire single housing structure in supported relation on the sill cock 62.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. Apparatus for connection with a sill cock for communicating water under pressure from the sill cock with a hose having a lawn sprinkler communicating therewith comprising a female coupler for connection with the sill cock, a male coupler for connection with the hose, valve means between said couplers movable into opened and closed positions with respect thereto so as to permit and prevent respectively communication of the water under pressure from the sill cock when said female coupler is connected therewith with the hose when said male coupler is connected therewith, battery means for providing a source of electrical current, battery operated valve moving means operable in response to the connection of the electric current from said battery means therewith for effecting movement of said valve means from its closed position into its opened position, battery operated programming means for selecting a sprinkling time in the future when it is desired to water with the sprinkler, battery operated display means for displaying the sprinkling time selected by said programming means, a first water control unit including a fixed housing structure containing said male coupler, said valve means, said battery operated valve moving means and said female coupler so as to render said first unit operable to be fixed to the sill cock in supported relation thereby when said female coupler is connected therewith, a manually portable programming unit including a portable housing structure containing said battery operated programming means, said battery operated display means, and said battery means operatively connected with said battery operated programming means and said battery operated display means, mounting means operatively associated with both of said units for interengagement to mount said portable unit in supported relation on said fixed first unit in an operative position and for disengagement to enable the portable unit to be disposed in a remote position with respect to said fixed first unit such that a user can operate said programming means remote from said fixed first unit allowing for observation of said display means at close eye-level proximity, and means operable when said portable unit is mounted on said fixed first unit in said operative position to connect an electrical current from said battery means contained in said portable unit with said battery operated valve moving means contained in said fixed first unit when the sprinkler time selected on said programming means arrives causing said valve means to be moved into its opened position and water under pressure from the sill cock connected with said female coupler to flow into the hose connected with said male coupler, said mounting means comprising a tubular supporting portion of said fixed housing structure and a tubular supported portion of said portable housing structure, said tubular supported portion being open at one end so as to permit the same to be moved through a docking movement in the direction of said open end with respect to said supporting portion in order to dispose said portable unit in supported relation on said fixed first unit in said operative position, said supporting and supported portions including (1) guiding surface means for guiding said supported portion in telescoping relation over said supporting portion during an initial portion of said docking movement and (2) sliding surface means for restricting a final portion of the docking movement to a substantial rectilinear movement, said electrical current connecting means including cooperating male and female electrical connectors interengageable during a final section of the final portion of said docking movement.

2. Apparatus as defined in claim 1 wherein said valve means comprises a ball valve mounted between said couplers for rotational movement in one direction and operable during successive 90° movements to move successively into one of said opened and closed positions, said valve moving means comprises a battery operated electric motor and a speed reduction assembly drivingly connected between said motor and said ball valve.

3. Apparatus as defined in claim 2 wherein said current connecting means includes a motor turn-off switch operable in response to said ball valve reaching each successive one of said opened and closed positions.

4. Apparatus as defined in claim 3 wherein cam means is operatively connected to move with said ball valve for operating said motor turn-off switch.

5. Apparatus as defined in claim 2 wherein said current connecting means includes an electrical plug assembly carried by one of said units and a cooperating electrical socket assembly carried by the other of said units engagable and disengagable with said plug assembly.

6. Apparatus as defined in claim 2 wherein said speed reduction assembly includes a series of axially aligned interconnected planetary gear sets.

7. Apparatus as defined in claim 2 wherein said programming means includes:
means for entering a sprinkling start time; and
means for entering a sprinkling run time.

8. Apparatus as defined in claim 7 wherein both said entering means include:
means for designating that said start time is to be entered;
means for designating that said run time is to be entered; and
means for changing any designated one of said start time and run time.

9. Apparatus as defined in claim 7 wherein said programming means further includes means for entering the time of day.

10. Apparatus as defined in claim 9 wherein said entering means together include:
means for designating that said start time is to be entered;
means for designating that said run time is to be entered;
means for designating that said time of day is to be entered; and means for changing any designated one of said start time, run time and time of day.

11. Apparatus as defined in claim 10 wherein said programming means and said display means include means for displaying said time of day and a previously entered start time and run time when said time of day, start time and run time, respectively, are designated to be entered.

12. Apparatus as defined in claim 1 wherein said programming means includes:
   means for entering a plurality of different sprinkling start times; and
   means for entering a separate sprinkling run time for each of said start times.

13. Apparatus as defined in claim 12 wherein said programming means further includes means for entering the time of day.

14. Apparatus as defined in claim 13 wherein said programming means and said display means include means for displaying said time of day and a previously entered start time and run time when said time of day, start time and run time, respectively, are designated to be entered.

15. Apparatus as defined in claim 13 wherein all of said entering means together include means for designating that said time of day is to be entered;
   means for designating that any one of said start times is to be entered;
   means for designating that any one of said run times is to be entered; and
   means for changing any designated one of said start times, run times and time of day.

16. Apparatus as defined in claim 1 wherein said mounting means includes means operable when said portable unit is mounted in supported relation on said fixed first unit for enabling said portable unit to be pivotally moved about a fixed axis on said first unit into a multiplicity of different adjusted positions.

17. Apparatus as defined in claim 16 wherein said male and female electrical connectors include respectively an electric plug assembly carried by one of said units and a cooperating electrical socket assembly carried by the other of said units engagable and disengagable with said plug assemblies, said plug and socket assemblies when engaged being aligned and symetrical with respect to with the fixed axis of pivotal movement of said portable unit on said first unit so as to accommodate such movement.

* * * * *